United States Patent
Yuan et al.

(10) Patent No.: US 12,323,706 B2
(45) Date of Patent: Jun. 3, 2025

(54) OPTICAL IMAGE STABILIZATION CAMERA MODULE

(71) Applicant: NINGBO SUNNY OPOTECH CO., LTD., Zhejiang (CN)

(72) Inventors: Dongli Yuan, Yuyao Ningbo (CN); Hu Wu, Yuyao Ningbo (CN); Hangang Wei, Yuyao Ningbo (CN); Jianhong Li, Yuyao Ningbo (CN); Jia Liu, Yuyao Ningbo (CN); Qiong Zhang, Yuyao Ningbo (CN); Jianbin Huang, Yuyao Ningbo (CN)

(73) Assignee: NINGBO SUNNY OPOTECH CO., LTD., Zhejiang (CN)

( * ) Notice: Subject to any disclaimer, the term of this patent is extended or adjusted under 35 U.S.C. 154(b) by 44 days.

(21) Appl. No.: 18/037,005

(22) PCT Filed: Oct. 29, 2021

(86) PCT No.: PCT/CN2021/127326
§ 371 (c)(1),
(2) Date: May 15, 2023

(87) PCT Pub. No.: WO2022/105572
PCT Pub. Date: May 27, 2022

(65) Prior Publication Data
US 2024/0022816 A1    Jan. 18, 2024

(30) Foreign Application Priority Data

| Nov. 19, 2020 | (CN) | .......................... 202011303700.X |
| Nov. 25, 2020 | (CN) | .......................... 202011334144.2 |

(51) Int. Cl.
*H04N 23/68* (2023.01)
*G02B 27/64* (2006.01)
(Continued)

(52) U.S. Cl.
CPC ......... *H04N 23/687* (2023.01); *G02B 27/646* (2013.01); *G03B 5/00* (2013.01);
(Continued)

(58) Field of Classification Search
CPC ...... G02B 27/646; H04N 23/51; H04N 23/54; H04N 23/57; H04N 23/687; G03B 5/00; G03B 2205/0076
(Continued)

(56) References Cited

U.S. PATENT DOCUMENTS

| 6,945,045 B2 * | 9/2005 | Hara ....................... F03G 7/065 |
| | | 60/527 |
| 7,640,741 B2 * | 1/2010 | Hara ....................... H04N 23/50 |
| | | 60/527 |

(Continued)

FOREIGN PATENT DOCUMENTS

| CN | 102739950 A | 10/2012 |
| CN | 102770804 A | 11/2012 |

(Continued)

OTHER PUBLICATIONS

International Search Report for PCT/CN2021/127326 (PCT/ISA/210) mailed on Jan. 20, 2022.
(Continued)

*Primary Examiner* — Pritham D Prabhakher
(74) *Attorney, Agent, or Firm* — Birch, Stewart, Kolasch & Birch, LLP

(57) ABSTRACT

The present application relates to an optical image stabilization camera module, comprising: a lens; a photosensitive assembly having a photosensitive chip; a first driving part adapted to drive the lens to translate in x-axis and y-axis directions; and a second driving part comprising a second basic portion and a second movable portion, the second driving part having four side surfaces, wherein each side
(Continued)

surface is provided with two interlaced SMA wires, and both ends of each SMA line are connected to a fixed end of the second basic portion and a fixed end of the second movable portion, respectively; each of the fixed ends is located at a corner area of the second basic portion or the second movable portion. The photosensitive assembly is fixed to the second movable portion, and the second movable portion is adapted to drive, under the drive of the SMA lines, the photosensitive chip to move in an xoy plane; and the lens and the photosensitive chip are configured to be simultaneously driven and move in opposite directions. According to the present application, the image stabilization stroke and the image stabilization response speed of the camera module can be improved at the cost of a small volume.

20 Claims, 9 Drawing Sheets

(51) Int. Cl.
  *G03B 5/00* (2021.01)
  *H04N 23/51* (2023.01)
(52) U.S. Cl.
  CPC ..... *H04N 23/51* (2023.01); *G03B 2205/0007* (2013.01); *G03B 2205/0076* (2013.01)
(58) Field of Classification Search
  USPC .................................................. 348/208.11
  See application file for complete search history.

(56) References Cited

U.S. PATENT DOCUMENTS

| | | | |
|---|---|---|---|
| 8,588,598 B2 * | 11/2013 | Topliss ..................... | G03B 3/10 396/73 |
| 8,830,335 B2 | 9/2014 | Topliss et al. | |
| 8,866,918 B2 * | 10/2014 | Gregory ............. | H04N 23/6812 348/208.99 |
| 9,661,213 B2 * | 5/2017 | Kim ......................... | G03B 3/10 |
| 10,063,756 B2 * | 8/2018 | Kim ......................... | G02B 7/08 |
| 10,893,200 B2 * | 1/2021 | Ba-Tis ................. | H04N 23/687 |
| 11,212,446 B2 * | 12/2021 | Nomura ............. | H04N 23/6811 |
| 11,531,183 B2 * | 12/2022 | Chen ..................... | G02B 7/09 |
| 11,733,477 B2 * | 8/2023 | Fang ....................... | G02B 7/09 359/823 |
| 2007/0109412 A1 * | 5/2007 | Hara ...................... | H04N 23/60 348/E5.025 |
| 2009/0175607 A1 | 7/2009 | Otake | |
| 2011/0091193 A1 * | 4/2011 | Lim ....................... | G02B 7/023 396/133 |
| 2011/0179786 A1 | 7/2011 | Topliss et al. | |
| 2011/0217031 A1 * | 9/2011 | Eromaki .................... | F03G 7/06 60/527 |
| 2011/0249131 A1 * | 10/2011 | Topliss ..................... | G03B 5/00 348/208.7 |
| 2012/0019675 A1 * | 1/2012 | Brown ................. | H04N 23/687 348/E5.045 |
| 2013/0002933 A1 * | 1/2013 | Topliss ................ | H04N 23/687 310/306 |
| 2013/0003201 A1 * | 1/2013 | Noda ....................... | G02B 7/08 359/823 |
| 2013/0222685 A1 * | 8/2013 | Topliss ................. | G02B 27/646 348/373 |
| 2015/0135703 A1 * | 5/2015 | Eddington ........... | G02B 27/646 60/528 |
| 2015/0346507 A1 * | 12/2015 | Howarth ................... | F03G 7/06 60/527 |
| 2016/0165125 A1 | 6/2016 | Kim | |
| 2017/0289455 A1 * | 10/2017 | Hu ......................... | H04N 23/57 |
| 2017/0353634 A1 | 12/2017 | Kim et al. | |
| 2018/0348593 A1 * | 12/2018 | Brown .................... | G03B 3/10 |
| 2019/0136839 A1 * | 5/2019 | Miller ....................... | F03G 7/06 |
| 2019/0373174 A1 | 12/2019 | Ba-tis et al. | |
| 2020/0310081 A1 * | 10/2020 | Chen ........................ | G03B 3/10 |
| 2020/0310224 A1 * | 10/2020 | Fang ....................... | F03G 7/0614 |
| 2020/0329199 A1 | 10/2020 | Nomura | |

FOREIGN PATENT DOCUMENTS

| | | |
|---|---|---|
| CN | 103837958 A | 6/2014 |
| CN | 105900006 A | 8/2016 |
| CN | 107277304 A | 10/2017 |
| CN | 109901347 A | 6/2019 |
| CN | 111629125 A | 9/2019 |
| CN | 209402560 U | 9/2019 |
| CN | 110784650 A | 2/2020 |
| CN | 210442607 U | 5/2020 |
| CN | 111258022 A | 6/2020 |
| CN | 210781015 U | 6/2020 |
| CN | 111556239 A | 8/2020 |
| CN | 211266959 U | 8/2020 |
| CN | 111698398 A | 9/2020 |
| JP | 2020086465 A | 6/2020 |

OTHER PUBLICATIONS

Extended European Search Report for European Application No. 21893720.9, dated Mar. 7, 2024.

* cited by examiner

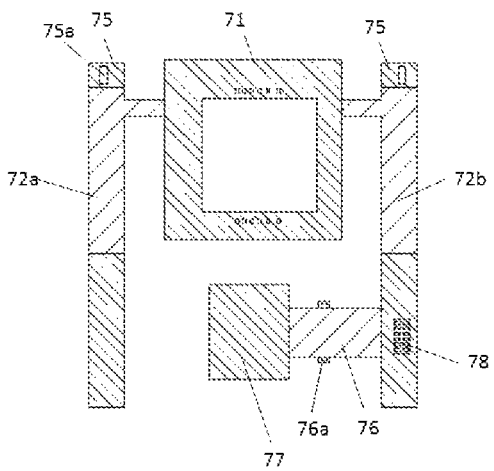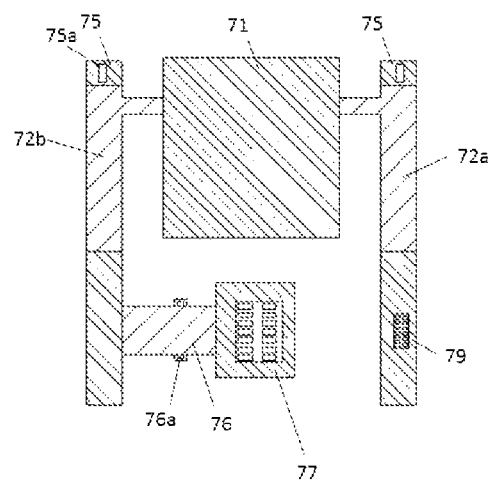
Fig. 17a    Fig. 17b
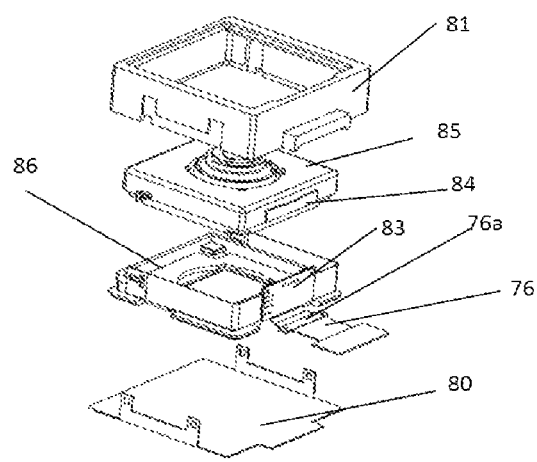
Fig. 18
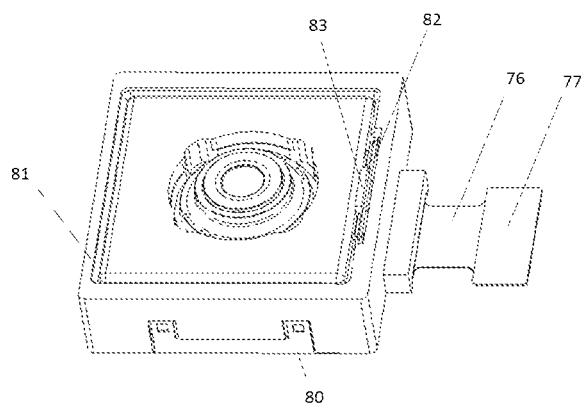
Fig. 19

OPTICAL IMAGE STABILIZATION CAMERA MODULE

CROSS-REFERENCE TO RELATED APPLICATIONS

The present application claims the priority of Chinese patent application No. 202011303700.X entitled "OPTICAL IMAGE STABILIZATION CAMERA MODULE" and filed on Nov. 19, 2020, and Chinese patent application No. 202011334144.2 entitled "OPTICAL IMAGE STABILIZATION CAMERA MODULE" and filed on Nov. 25, 2020, the entire disclosure of which is incorporated herein by reference.

TECHNICAL FIELD

The present disclosure relates to the technical field of camera equipment. Specifically, the present disclosure relates to an optical image stabilization camera module.

TECHNICAL BACKGROUND

With the increasing demand of consumers for mobile phone photography, the functions of mobile phone cameras (i.e., camera modules) are becoming more and more diverse, and functions such as portrait photographing, telephoto photographing, optical zoom, and optical image stabilization are integrated into a camera with a limited volume, wherein autofocus, optical image stabilization, optical zoom and other functions often need to rely on optical actuators (which may also sometimes be referred to as motors) to achieve.

FIG. 1 shows a typical camera module with a motor in the prior art. Referring to FIG. 1, the camera module generally comprises a lens 1, a motor mechanism 2 (which may be simply referred to as a motor) and a photosensitive assembly 3. In the photographing state of the camera module, light from a photographed object is focused on a photosensitive element 3a of the photosensitive assembly 3 through the lens 1. Structurally, the lens 1 is fixed on a motor carrier of the motor (shown in detail in FIG. 1). The motor carrier is a movable component, and it can usually drive, under the action of a driving element of the motor, the lens 1 to move in the direction of an optical axis, so as to achieve a focus function. As for a camera module with an optical image stabilization (OIS) function, the motor often has a more complicated structure. This is because, in addition to driving the lens to move in the direction of the optical axis, the motor needs to drive the lens 1 to move in other degrees of freedom (e.g., a direction perpendicular to the optical axis) to compensate for the shake during photographing. Generally, the shake of the camera module comprises translation in a direction perpendicular to the optical axis (translation in x-axis and y-axis directions) and rotation (referring to rotation in an xoy plane, wherein its rotation axis direction may be roughly the same as the optical axis), and tilt shake (referring to rotation around the x and y axes, wherein in the field of camera modules, tilt shake is also called tilt jitter). When a gyroscope (or another position sensing element) in the module detects shake in a certain direction, it can issue an instruction to make the motor drive the lens to move by a distance in the opposite direction, thereby compensating for the shake of the lens. Generally, the lens is only translated and/or rotated in or with respect to the direction perpendicular to the optical axis to compensate for the shake of the camera module. This is due to a fact that if the lens is rotated around the x and y axes, that is, if the tilt adjustment of the lens is used to achieve an image stabilization effect, the imaging quality of the module may be reduced, and even blurring may be caused, which makes it difficult to meet the basic imaging quality requirements.

However, as the imaging quality requirements of mobile phone camera modules are increasingly becoming higher, the volume and weight of the lens are increasingly becoming larger, and the driving force requirements for the motor are also increasingly becoming higher. However, current electronic devices (such as mobile phones) also have great restrictions on the volume of the camera module, and the occupied volume of the motor increases correspondingly with the size increase of the lens. In other words, as the lens develops towards larger volume and heavier weight, it is difficult to increase the driving force provided by the motor accordingly. Insofar as the driving force is limited, the heavier the lens, the shorter the stroke the motor can drive the lens to move, which will affect the image stabilization ability. On the other hand, the heavier the lens, the slower the motor can drive the lens to move, and the longer the time it takes for the lens to reach a predetermined compensation position, which will also affect the image stabilization effect.

Therefore, there is an urgent need for a solution that can improve the image stabilization stroke and image stabilization response speed of the camera module.

SUMMARY

An objective of the present disclosure is to overcome the deficiencies of the prior art and provide a solution that can improve the image stabilization stroke and image stabilization response speed of the camera module.

In order to solve the above technical problem, the present disclosure provides an optical image stabilization camera module, comprising: a lens; a photosensitive assembly having a photosensitive chip; a first driving part adapted to mount the lens and drive the lens to translate in the directions of an x-axis and a y-axis; and a second driving part comprising a second basic portion and a second movable portion, wherein the second basic portion and the second movable portion are movably connected by means of an elastic connecting portion, and the second driving part has four side surfaces; each side surface is provided with two interlaced SMA wires, and two ends of each SMA wire are connected to a fixed end of the second basic portion and a fixed end of the second movable portion, respectively; and each of the fixed ends is located in a corner area of the second basic portion or the second movable portion; wherein the photosensitive assembly is fixed on the second movable portion, and the second movable portion is adapted to drive, under the drive of the SMA wires, the photosensitive chip to move in an xoy plane; and the lens and the photosensitive chip are configured to be simultaneously driven and move in opposite directions; and wherein the x-axis and the y-axis are coordinate axes perpendicular to an optical axis of the camera module, the x-axis and the y-axis are perpendicular to each other, and the xoy plane is a plane formed by the x-axis and the y-axis.

In the optical image stabilization camera module, the second driving part has four corner areas, each corner area is provided with two fixed ends, and the two ends of each SMA wire are fixed and electrically connected to the fixed ends of two adjacent corner areas, respectively.

In the optical image stabilization camera module, in any one of the corner areas, the two fixed ends are arranged along a direction of the optical axis. In this case, the two interlaced SMA wires are approximately in an xoz plane or a yoz plane (the z-axis is a coordinate axis parallel to the optical axis), that is, the two fixed ends of the corner area are arranged vertically (for example, one fixed end is located directly above the other fixed end). The z-axis is a coordinate axis parallel to the optical axis. The interlacing of two SMA lines means that the projections of the two SMA lines in the xoz plane or the yoz plane cross, but the two SMA lines are not in direct contact, to avoid mutual interference when the two SMA lines shrink, resulting in a decrease in the accuracy of position adjustment.

In the optical image stabilization camera module, the four fixed ends of any two adjacent corner areas are all located in a plane parallel to the xoy plane. For example, in any one of the corner areas, one fixed end is located on an outer side of the other fixed end. Here, the outer side refers to a side away from the photosensitive center of the photosensitive chip, and the inner side refers to a side toward the photosensitive center of the photosensitive chip.

In the optical image stabilization camera module, the two fixed ends of each corner area comprise a type-A fixed end and a type-B fixed end, wherein the type-A fixed end and the type-B fixed end are at different heights; the type-A fixed ends located in two diagonal corner areas are at the same height, and the type-B fixed ends located in two diagonal corner areas are also at the same height; each side surface of the second driving part is provided with two SMA wires, wherein the two ends of each SMA wire are connected to one of the type-A fixed ends and one of the type-B fixed ends located in adjacent corner areas, respectively, so that the two SMA wires are interlaced with each other.

In the optical image stabilization camera module, the four type-A fixed ends of the four corner areas are at the same height; and the four type-B fixed ends of the four corner areas are at the same height.

In the optical image stabilization camera module, the four corner areas comprise a first corner, a second corner, a third corner and a fourth corner, wherein the first corner and the third corner are located on one diagonal line of the second driving part, and the second corner and the fourth corner are located on the other diagonal line of the second driving part; the second movable portion extends outward at the first corner and the third corner respectively to form a first extension portion and a third extension portion; and the first extension portion is provided with a first A fixed end and a first B fixed end at different heights, and the third extension portion is provided with a third A fixed end and a third B fixed end at different heights; a second A fixed end and a second B fixed end at different heights are provided at a position of the second corner of the second basic portion; and a fourth A fixed end and a fourth B fixed end at different heights are provided at a position of the fourth corner of the second basic portion; and the first A fixed end, the second A fixed end, the third A fixed end and the fourth A fixed end all belong to the type-A fixed ends; and the first B fixed end, the second B fixed end, the third B fixed end and the fourth B fixed end all belong to the type-B fixed ends.

In the optical image stabilization camera module, the second movable portion further has notches at the second corner and the fourth corner, respectively, to avoid the fixed ends provided on the second basic portion.

In the optical image stabilization camera module, the type-A fixed end and the type-B fixed end located in the same corner area are stacked, and the two are separated by an insulating material.

In the optical image stabilization camera module, the second movable portion is further adapted to drive, under the drive of the SMA wires, the photosensitive chip to move in a direction of rotation around a z-axis; wherein the z-axis is a coordinate axis parallel to the optical axis.

In the optical image stabilization camera module, the second movable portion is further adapted to drive, under the drive of the SMA wires, the photosensitive chip to move in a direction of translation along a z-axis; wherein the z-axis is a coordinate axis parallel to the optical axis.

In the optical image stabilization camera module, the four corner areas comprise a first corner, a second corner, a third corner and a fourth corner, wherein the first corner and the third corner are located on a first diagonal line of the second driving part, and the second corner and the fourth corner are located on a second diagonal line of the second driving part; the second movable portion extends outward at the first corner and the third corner respectively to form a first extension portion and a third extension portion; the two fixed ends of the first corner of the second driving part are provided on the first extension portion, and the two fixed ends of the third corner of the second driving part are provided on the third extension portion; the two fixed ends of the second corner of the second driving part are provided at a second corner of the second basic portion, and the two fixed ends of the fourth corner of the second driving part are provided at a fourth corner of the second basic portion; for each side surface of the second driving part, the two interlaced SMA wires provided on the side surface are fixed and electrically connected to the four fixed ends located in the two corner areas of the side surface; wherein a translational component of the photosensitive chip in a direction of the first diagonal line or in a direction of the second diagonal line is generated by driving two pairs of interlaced SMA wires on two intersecting side surfaces of the second driving part to shrink; and the translational component in the direction of the first diagonal line is combined with the translational component in the direction of the second diagonal line, so that a movement direction of the photosensitive chip in the xoy plane is opposite to a movement direction of the lens.

In the optical image stabilization camera module, rotation of the photosensitive chip in an Rz direction is generated by driving two pairs of interlaced SMA wires on two opposite side surfaces of the second driving part to shrink, wherein the Rz direction is a direction of rotation around a z-axis, and the z-axis is a coordinate axis parallel to the optical axis.

In the optical image stabilization camera module, a rotation component of the photosensitive chip in an Rx or Ry direction is generated by driving a single SMA wire on a single side surface of the second driving part to shrink; wherein the Rx direction is a direction of rotation around the x-axis, and the Ry direction is a direction of rotation around the y-axis.

In the optical image stabilization camera module, translation of the photosensitive chip in a direction of a z-axis is generated by driving a first group of SMA wires and a second group of SMA wires of the second driving part to shrink; and a translation direction of the photosensitive chip in the z-axis direction is opposite to a translation direction of the lens in the z-axis direction, wherein the z-axis is a coordinate axis parallel to the optical axis; wherein the first group of SMA wires are two SMA wires with a first common fixed end, and the two SMA wires are located on two intersecting side surfaces of the second driving part, respectively; the second group of SMA wires are the other two SMA wires with a second common fixed end, and the other two SMA wires are located on the other two intersecting sides of the second driving part; and each of the first common fixed end and the second common fixed end is one of eight fixed ends of the second driving part, and the first common fixed end and the second common fixed end are located at the same height.

In the optical image stabilization camera module, the first driving part comprises a first basic portion and a first movable portion, and the second basic portion is fixed on the first basic portion.

In the optical image stabilization camera module, the first basic portion is located on the periphery of the first movable portion; the second basic portion comprises a basic portion side wall and a base, a bottom surface of the basic portion side wall is connected to the base, and a top surface of the basic portion side wall is connected to the first basic portion.

In the optical image stabilization camera module, an edge area of the bottom surface of the first basic portion forms a step-shaped notch, and the basic portion side wall can extend upward and into the step-shaped notch and be connected to the first basic portion.

In the optical image stabilization camera module, the second movable portion comprises a movable portion main body, the movable portion main body is of a flat plate shape, and has a light-passing hole in its center; and an outer edge area of the bottom surface of the movable portion main body extends downward to form the movable portion side wall.

In the optical image stabilization camera module, the photosensitive assembly comprises the photosensitive chip, a circuit board, a lens holder and a filter; the photosensitive chip is mounted on an upper surface of the circuit board, the lens holder is mounted on the upper surface of the circuit board and surrounds the photosensitive chip, and the filter is mounted on the lens holder; a bottom surface of the movable portion side wall is bonded to the upper surface of the circuit board of the photosensitive assembly; and an inner side surface of the movable portion side wall, a bottom surface of the movable portion main body, and the upper surface of the circuit board and an outer side surface of the lens holder form an accommodating cavity among them, and electronic elements are arranged in the accommodating cavity.

In the optical image stabilization camera module, an inner edge area of the movable portion main body has a step-shaped notch facing an object side to avoid part of a structure of the optical lens.

In the optical image stabilization camera module, the second basic portion is fixed to the first driving part, the second basic portion comprises a basic portion side wall, the basic portion side wall surrounds the second movable portion, and there is a gap between the basic portion side wall and the second movable portion for accommodating the SMA wires.

In the optical image stabilization camera module, the photosensitive assembly comprises a suspended circuit board, and the suspended circuit board comprises a rigid circuit board main body and a flexible connecting band; the connecting band is led out from a first side surface and a second side surface of the circuit board main body and bent upwards to form a bent portion; a top part of the bent portion extends along the periphery of the photosensitive assembly in a horizontal direction, so that the connecting band surrounds the periphery of a first side surface, a second side surface and a third side surface of the photosensitive assembly; and the connecting band has at least one suspension portion on each of the first side surface and the second side surface, and the suspension portion is fixed to the second basic portion of the second driving part or fixed to the second basic portion through an intermediate object; wherein the photosensitive assembly has a first side surface and a second side surface which are at the same positions as those of the circuit board main body, the first side surface and the second side surface are arranged oppositely, and the third side surface intersects both the first side surface and the second side surface.

In the optical image stabilization camera module, the suspension portion has a suspension hole, the second basic portion or the intermediate object has a hook, and the hook is hooked to the suspension hole.

In the optical image stabilization camera module, a part of sections of the connecting band are attached to a rigid substrate for reinforcement to form the suspension portion.

In the optical image stabilization camera module, the suspended circuit board is made of a rigid-flex board, wherein the circuit board main body and the suspension portion are formed by a rigid board part of the rigid-flex board, and the bent portion and a connecting band section connected between a plurality of suspension portions are formed by a flexible board part of the rigid-flex board.

In the optical image stabilization camera module, the connecting band comprises a third connecting band and a fourth connecting band, and the third connecting band is led out from the first side surface of the circuit board main body and bent upward to form a bent portion, then extends along the first side surface of the photosensitive assembly, is bent in a horizontal direction at a corner and continues to extend along the third side surface; the fourth connecting band is led out from the second side surface of the circuit board main body and bent upward to form another bent portion, then extends along the second side surface of the photosensitive assembly, and is horizontally bent at a corner and continues to extend along the third side surface; and the third connecting band and the fourth connecting band are joined and electrically conducted with each other at the third side surface.

In the optical image stabilization camera module, the camera module further comprises a first connecting band electrically connected to the first driving part, and the first connecting band is led out from a top area of the first driving part, then bent downward and jointed and electrically conducted with the third connecting band or the fourth connecting band on the third side surface.

In the optical image stabilization camera module, the camera module further comprises a housing, and an inner side surface of the housing has an accommodating groove for accommodating a joint portion of the third side surface; wherein the joint portion represents a joint portion where the first connecting band, the third connecting band and the fourth connecting band are joined to each other; and the accommodating groove is filled with a glue material to fix the first connecting band, the third connecting band and the fourth connecting band to the housing.

In the optical image stabilization camera module, the connecting band located on the third side surface is further connected to a fifth connecting band, and the fifth connecting band has a connector for external connection; and the suspended circuit board further has a fixing portion for fixing the fifth connecting band.

In the optical image stabilization camera module, a lens movement distance b by which the first driving module drives the lens to move, and a photosensitive chip movement distance c by which the second driving module drives the photosensitive chip to move, are determined according to a detected tilt-shake angle a of the camera module; wherein the lens movement distance b, the photosensitive chip movement distance c and an image-side focal length f of the camera module satisfy: $a=\arctan(b/f)+\arctan(c/f)$.

In the optical image stabilization camera module, the driving structure further comprises a driving logic module, which is used/configured to maintain a ratio between the lens movement distance b and the photosensitive chip movement distance c at a preset fixed ratio.

In the optical image stabilization camera module, the driving structure further comprises a driving logic module having an image stabilization threshold K; the driving logic module is used/configured to: when the tilt-shake angle a is less than or equal to the image stabilization threshold K, cause a ratio of the lens movement distance b and the photosensitive chip movement distance c to maintain at a preset fixed ratio, and when the tilt-shake angle a is greater than the image stabilization threshold K, cause the photosensitive chip movement distance c to reach a maximum value $c_{max}$ of its moving stroke; and the lens movement distance b is calculated according to a relational formula $b=\tan(a/f)-c_{max}$.

In the optical image stabilization camera module, the preset fixed ratio of the lens movement distance to the photosensitive chip movement distance is set according to weight of the lens, driving force of the first driving part, weight of the photosensitive chip or the photosensitive assembly, and driving force of the second driving part, so that the lens and the photosensitive chip move to their respective image stabilization target positions in the same time.

Compared with the prior art, the present application has at least one of the following technical effects:

1. The present application can improve the image stabilization stroke of the camera module, so that a larger shake of the camera module may be compensated for.
2. The present application can improve the image stabilization response speed of the camera module.
3. The optical image stabilization camera module of the present application has the advantage of compact structure, which is especially suitable for miniaturized camera modules.
4. In some embodiments of the present application, settings may be made according to factors such as the weight of the lens, the driving force of the first driving part, the weight of the photosensitive chip (or photosensitive assembly), the driving force of the second driving part, etc., so that the lens and the photosensitive chip move to their respective image stabilization target positions in the same time, thereby obtaining a better image stabilization effect.
5. In some embodiments of the present application, by arranging interlaced SMA wires on the four sides of the second driving part, the photosensitive chip may be adjusted on multiple degrees of freedom in a small space.
6. In some embodiments of the present application, the translational component of the photosensitive chip in the direction of the first diagonal line or in the direction of the second diagonal line may be generated by driving two pairs of interlaced SMA wires on two intersecting side surfaces of the second driving part to shrink; and the translational component in the direction of the first diagonal line is combined with the translational component in the direction of the second diagonal line, so that the movement direction of the photosensitive chip in the xoy plane is opposite to the movement direction of the lens. According to this design, the image stabilization stroke and the image stabilization response speed of the camera module may be improved at the cost of a small volume.
7. In some embodiments of the present application, in the second driving part, in any one of the corner areas, the two fixed ends are arranged along the optical axis direction. According to this arrangement, the space of the photosensitive assembly in the height direction (z-axis direction) may be effectively used, which will thus not increase the height of the camera module. At the same time, the space in the x-axis and y-axis directions of the camera module can be saved, thereby reducing the lateral dimension of the camera module.
8. In some embodiments of the present application, the glue material for bonding the first basic portion and the second basic portion is arranged between the step-shaped notch of the first basic portion and the top surface of the basic portion side wall extending into the notch, so as to prevent the problem of camera module photo stains caused by the overflow of AA glue material.

BRIEF DESCRIPTION OF THE DRAWINGS

FIG. 17a shows a schematic front view of a suspended circuit board in another embodiment of the present application after being unfolded;

FIG. 17b shows a schematic rear view of a suspended circuit board in an embodiment of the present application after being unfolded;

FIG. 18 shows a perspective exploded schematic view of a camera module based on a suspended circuit board in an embodiment of the present application;

FIG. 19 shows a schematic perspective view of a camera module based on a suspended circuit board including a housing in an embodiment of the present application;

DETAILED DESCRIPTION OF THE EMBODIMENTS

Figure 1:
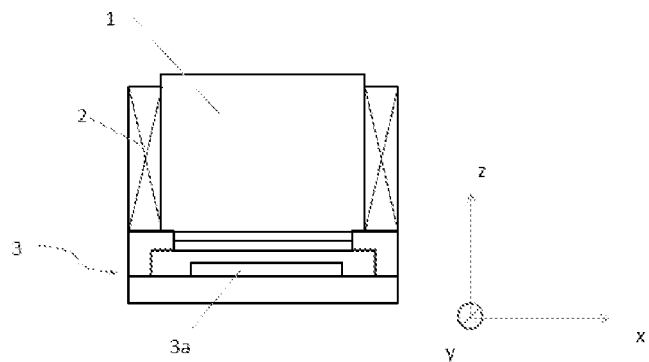
FIG. 1 shows a typical camera module with a motor in the prior art.

In order to better understand the present application, various aspects of the present application will be described in more detail with reference to the drawings. It should be understood that the detailed description is merely description of exemplary implementations of the present application, and does not limit the scope of the present application in any way. Throughout the description, the same reference numerals refer to the same elements. The expression "and/or" includes any and all combinations of one or more of the associated listed items.

It should be noted that in the present description, the expressions of "first", "second", etc. are only used to distinguish one feature from another feature, and do not indicate any limitation on the feature. Therefore, without departing from the teachings of the present application, a first main body discussed below may also be referred to as a second main body.

In the drawings, for convenience of explanation, the thickness, size, and shape of the object have been slightly exaggerated. The drawings are only examples and are not drawn strictly to scale.

It should also be understood that the terms "comprising", "comprise", "having", "including" and/or "include" when used in the present description, indicate the existence of stated features, integers, steps, operations, elements and/or components, but does not exclude the presence or addition of one or more other features, integers, steps, operations, elements, components and/or combinations thereof. Furthermore, when an expression such as "at least one of" appears after a list of listed features, it modifies the entire list of features, rather than individual elements in the list. In addition, when describing an implementation of the present application, "may"/"can" is used to denote "one or more implementations of the present application". Also, the term "exemplary" is intended to refer to an example or illustration.

As used herein, the terms "substantially", "approximately" and similar terms are used as a term expressing an approximation and not as a term expressing an extent, and are intended to indicate an inherent deviation in a measurement value or calculated value, which will be recognized by those of ordinary skill in the art.

Unless otherwise defined, all terms (including technical and scientific terms) used herein have the same meanings as commonly understood by those of ordinary skill in the art to which the present application belongs. It should also be understood that the terms (such as those defined in commonly used dictionaries) should be interpreted to have meanings consistent with their meaning in the context of the relevant art and will not be interpreted in an idealized or overly formal sense unless it is clearly defined herein.

It needs to be noted that, in the case of no conflict, the embodiments in the present application and the features in the embodiments may be combined with each other.

The present disclosure will be further described below in conjunction with the drawing and specific embodiments.

Figure 2:
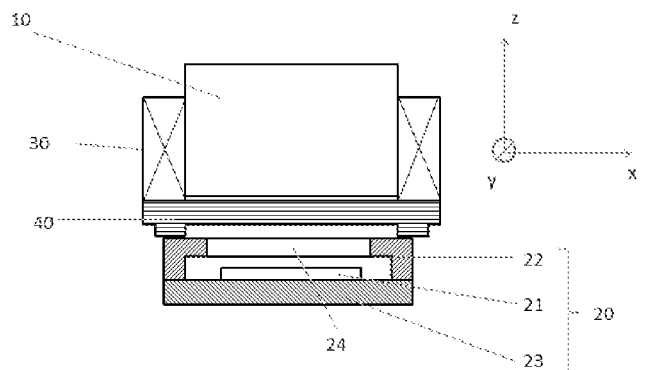
FIG. 2 shows a schematic sectional view of a camera module with an image stabilization function according to an embodiment of the present application.

FIG. 2 shows a schematic sectional view of a camera module with an image stabilization function according to an embodiment of the present application. Referring to FIG. 2, in this embodiment, the camera module comprises a lens 10, a photosensitive assembly 20, a first driving part 30 and a second driving part 40. The photosensitive assembly 20 comprises a photosensitive chip 21. The first driving part 30 is configured to drive the lens 10 to move in x and y directions, and the second driving part 40 is configured to drive the photosensitive chip 21 to move in the x and y directions. In this embodiment, the x and y directions are perpendicular to each other, and both are parallel to a photosensitive surface of the photosensitive element 20. A z direction is parallel to the normal direction of the photosensitive surface. For ease of understanding, FIG. 2 also shows a three-dimensional Cartesian coordinate system constructed based on the x, y and z directions. In this embodiment, the optical image stabilization of the camera module is realized by controlling the module to simultaneously drive the lens 10 and the photosensitive chip 21 to move in opposite directions. Specifically, the lens 1 and the photosensitive chip 21 are configured to be simultaneously driven and move in opposite directions. For example, when the lens 10 is driven to move in the positive direction of the x-axis, and the photosensitive chip 21 is driven to move in the negative direction of the x-axis. If the lens 10 is driven to move in the positive direction of the y-axis, the photosensitive chip 21 is driven to move in the negative direction of the y-axis; or the lens 10 is driven to move in the x-axis and y-axis, and at the same time, the photosensitive chip 21 is driven to move toward the direction opposite to the movement direction of the lens 10 in the x-axis and the y-axis. In other words, when it is necessary to move on the x-axis and the y-axis at the same time, the directions of the displacement vector of the lens 10 and the displacement vector of the photosensitive chip 21 in the xoy plane are opposite. The camera module usually comprises a position sensor, and the position sensor is used to detect the shake of the camera module or a terminal device (i.e., an electronic device equipped with the camera module, such as a mobile phone). When shake is detected, the position sensor sends a signal to the camera module, and the lens 10 and the photosensitive chip 21 are driven to move accordingly to compensate for the shake, so as to achieve the purpose of optical image stabilization. In this embodiment, the lens 10 and the photosensitive chip 21 are configured to move simultaneously, and the lens 10 and the photosensitive chip 21 move in opposite directions, which can achieve faster response and a better image stabilization effect. In addition, the image stabilization angle range of the camera module is usually limited by a suspension system and a driving system, and a relatively large compensation angle range cannot be achieved. In this embodiment, the lens 10 and the photosensitive chip 21 are simultaneously driven to move in opposite directions so as to achieve large-angle shake compensation. In addition, in this embodiment, by simultaneously driving the lens 10 or the photosensitive chip 21 to move in opposite directions, compared with the solution of only driving the lens 10 to move, there is a larger relative movement stroke between the lens 10 and the photosensitive chip 21 (for ease of description, this relative movement stroke may be simply referred to as an image stabilization stroke), which can have a better compensation effect. In particular, due to the increase of the image stabilization stroke, this embodiment also has a better compensation effect for the tilt shake of the camera module. Further, the moving direction of the image stabilization movement in this embodiment may be limited in the xoy plane, and it is not necessary to tilt the optical axis of the lens 10 or the photosensitive chip 21, thereby avoiding the problem of image blur caused by the image stabilization movement.

Further, in another embodiment of the present application, the photosensitive chip 21 may also be driven by the second driving part 40 to rotate in the xoy plane, so as to compensate for the shake in the rotation direction of the camera module.

Further, still referring to FIG. 2, in an embodiment of the present application, the camera module comprises a first driving part 30, a lens 10, a second driving part 40 and a photosensitive assembly 20. The lens 10 is mounted on the first driving part 30. The first driving part 30 may have a first motor carrier of a cylindrical shape, the first motor carrier may be used as a movable portion of the first driving part, and the lens is mounted on an inner side surface of the first motor carrier. The first driving part further has a stationary portion, which may also be referred to as a basic portion. In this embodiment, the basic portion may be implemented as a motor casing. The motor casing may comprise a base and a cover. The base has a light-passing hole. The movable portion is movably connected to the basic portion. The driving element may be a coil magnet combination, which may be mounted between the movable portion and the basic portion. For example, it may be mounted between the first motor carrier and the motor casing. In practice, the first driving part in this embodiment may directly adopt a common structure of an optical image stabilization motor in the prior art. Further, in this embodiment, the second driving part 40 may be borne against and fixed on the bottom surface of the first driving part 30. The second driving part 40 may also comprise a basic portion and a movable portion. The basic portion is directly connected to the first driving part. The movable portion is located below the basic portion and is movably connected to the basic portion. The photosensitive assembly 20 comprises a circuit board 23, a photosensitive chip 21 mounted on the surface of the circuit board, and a lens holder 22 surrounding the photosensitive chip 21. The bottom of the lens holder 22 may be mounted on the surface of the circuit board 23, and the top surface of the lens holder 22 may be fixed on the movable portion of the second driving part 40. The center of the lens holder 22 has a light-passing hole, and a filter 24 is mounted on the lens holder 22 (the filter 24 may also be regarded as an integral part of the photosensitive assembly 20). Under the drive of the movable portion of the second driving part 40, the photosensitive assembly 20 can translate relative to the basic portion in the x and y directions or rotate in the xoy plane. For ease of description, herein, the basic portion of the first driving part 30 is sometimes referred to as a first basic portion, the basic portion of the second driving part 40 is sometimes referred to as a second basic portion, the movable portion of the first driving part 30 is sometimes referred to as a first movable portion, and the movable portion of the second driving part 40 is sometimes referred to as a second movable portion.

Figure 3:
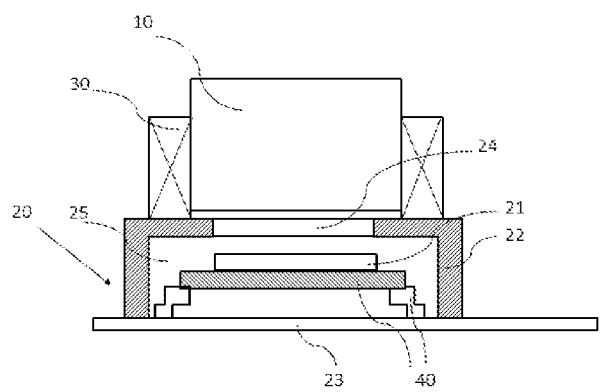
FIG. 3 shows a schematic sectional view of a camera module with an image stabilization function according to another embodiment of the present application.

FIG. 3 shows a schematic sectional view of a camera module with an image stabilization function according to another embodiment of the present application. In this embodiment, the camera module comprises a first driving part 30, a lens 10, a second driving part 40 and a photosensitive assembly 20. The lens 10 is mounted on the first driving part 30. The structures and assembling methods of the first driving part 30 and the lens 10 may be the same as those of the previous embodiment shown in FIG. 2, and will not be repeated here. This embodiment is different from the previous embodiment in that the second driving part 40 is located inside the photosensitive assembly 20. In this embodiment, the photosensitive assembly 20 comprises a circuit board 23, a lens holder 22, a filter 24, and a photosensitive chip 21. The bottom of the lens holder 22 may be mounted on the surface of the circuit board 23, and the top surface of the lens holder 22 may be fixed on the basic portion of the first driving part 30. The center of the lens holder 22 has a light-passing hole, and a filter 24 is mounted on the lens holder 22. The lens holder 22, the filter 24 and the circuit board 23 can form a cavity, and the photosensitive chip 21 is located in the cavity 25. In this embodiment, the second driving part 40 may also be located in the cavity 25. Specifically, the basic portion of the second driving part 40 may be mounted on the surface of the circuit board 23, and the movable portion of the second driving part 40 is movably connected to the basic portion. The photosensitive chip 21 is mounted on the surface of the movable portion. In this way, under the drive of the movable portion of the second driving part 40, the photosensitive chip 21 can translate relative to the basic portion in the x and y directions or rotate in the xoy plane.

Different structural implementations of the second driving part of the camera module of the present application have been described above with reference to the two embodiments. A method for compensating for the tilt shake of the camera module based on the design idea of the present application will be further described below.

Figure 4:
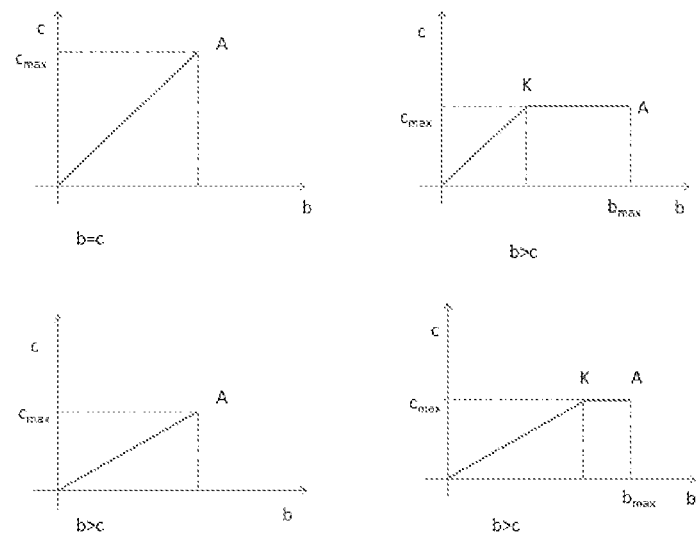
FIG. 4 shows schematic diagrams of the relationships between movement distances of a lens and a photosensitive chip and a tilt angle of a module in four different situations in the present application.

FIG. 4 shows schematic diagrams of the relationships between movement distances of the lens and the photosensitive chip and a tilt angle of the module in four different situations in the present application. Position A in the figure represents a combination of movement distances of the lens and the photosensitive chip for compensating the shake angle a of the camera module. As shown in FIG. 4, in the figure, the movement distance of the lens is b, the movement distance of the photosensitive chip (hereinafter sometimes simply referred to as the chip) is c, and the movement distance of the lens or chip can be equivalent to an angle of an image plane deviating from an optical axis during optical imaging. Specifically, when the translation distance of the lens in the xoy plane is b, it causes an arithmetic relationship between an image plane offset angle $\alpha 1$ and an image distance. The image distance is different under different photographing distances. For the convenience of calculation and expression, the image distance is replaced by an image side focal length here. Specifically, it causes the relationship between the image plane shift angle α1 and the image side focal length f of the lens to be: $\tan(\alpha 1)=b/f$, and when the photosensitive chip moves by a distance c in the xoy plane, it causes the relationship between the image plane shift angle α2 and the image side focal length f of the lens to be: $\tan(\alpha 2)=c/f$. In this embodiment, the moving directions of the lens and the photosensitive chip are opposite, so the comprehensive compensation angle a of the camera module is calculated as: $a=\alpha 1+\alpha 2=\arctan(b/f)+\arctan(c/f)$. In one embodiment, the movement distances of the lens and the photosensitive chip may be set to be the same, that is, b=c. In another embodiment, the movement distances of the lens and the photosensitive chip may be set to be unequal. For example, the movement distance of the lens may be greater than the movement distance of the photosensitive chip, that is, b>c. In this embodiment, the second driving part can select a driver with a smaller size (e.g., a mems driver, etc., wherein the movable stroke of such a driver is usually relatively small), so as to facilitate the overall miniaturization of the camera module.

Further, in an embodiment of the present application, a ratio of the movement distance of the lens to the movement distance of the photosensitive chip is optionally set to maintain a fixed ratio, such as b/c=6:4, or b/c=7:3, or b/c=5:5. No matter what the compensation value of the camera module shake (such as the comprehensive compensation angle a) is, the movement distances of the lens and the photosensitive chip are maintained at the preset ratio, which is advantageous for the uniform compensation effect of the camera module within a compensable range, and is also advantageous to reduce the design difficulty of the driving logic module of the image stabilization system of the camera module.

Further, in the configuration in which the movement distance of the lens and the movement distance of the photosensitive chip are based on a fixed ratio for image stabilization movement, because the movable range of the photosensitive chip is small, sometimes the shake of the camera module may exceed the maximum moving stroke of the photosensitive chip. Therefore, in an embodiment of the present application, an image stabilization threshold may be set. For example, for the shake angle a that needs to be compensated, a threshold K may be set. When the actually calculated shake angle a is less than or equal to the image stabilization threshold K, the movement distance b of the lens and the movement distance c of the photosensitive chip are maintained at a fixed ratio, and the fixed ratio may be preset, for example, b/c=6:4, or b/c=7:3, or b/c=5:5. When the actually calculated shake angle a is greater than the image stabilization threshold K, the movement distance c of the photosensitive chip takes the maximum value of its movement stroke, i.e. the photosensitive chip maximum stroke $c_{max}$, and the movement distance of the lens is $b=\tan(a/f)-c_{max}$. In other words, when the shake angle of the camera module that needs to be compensated is above the image stabilization threshold K, based on the preset fixed ratio, the lens moves to a position corresponding to the maximum movement distance of the photosensitive chip (i.e., the photosensitive chip maximum stroke $c_{max}$), and then the first driving part may drive the lens to continue to move until the lens moves by a distance $b=\tan(a/f)-c_{max}$. At the same time, the photosensitive chip synchronously moves by the maximum movement distance $c_{max}$ of the photosensitive chip in the opposite direction, and then remains stationary.

Further, in another embodiment of the present application, in the xoy plane, an image stabilization angle corresponding to the maximum stroke $b_{max}$ of the lens movement (the image stabilization angle refers to an angle at which the camera module tilts and shakes) may be less than an image stabilization angle corresponding to the photosensitive chip maximum stroke $c_{max}$. Under this design, the image stabilization system of the camera module can have a faster response speed. In a high-end lens, the lens often has a large number of lens elements. For example, at present, the number of lens elements in a rear main camera lens of a smart phone can reach 8, and in order to further improve the image quality, some lenses also use glass lens elements, all of which result in the heavier weight of the lenses. When the driving force does not increase significantly, the speed at which a driving device drives the lens to move will decrease. However, the photosensitive chip or photosensitive assembly is relatively light in weight, and can reach a preset position with a small driving force. Therefore, in the solution of this embodiment, the advantages of the photosensitive chip or photosensitive assembly being relatively close in weight and relatively fast moving can be better utilized to effectively improve the response speed of the image stabilization system of the camera module.

Further, in another embodiment of the present application, the fixed ratio of the movement distance of the lens to the movement distance of the photosensitive chip may be set according to the weight of the lens, the driving force of the first driving part, the weight of the photosensitive chip (or the photosensitive assembly), the driving force of the second driving part and other factors are set. An appropriate fixed ratio is set, so that the lens and the photosensitive chip move to their respective image stabilization target positions substantially in the same time, so as to obtain a better image stabilization effect. Specifically, the weight of the lens and the driving force of the first driving part can substantially determine the moving speed of the lens, and the weight of the photosensitive chip (or the photosensitive assembly) and the driving force of the second driving part can substantially determine the moving speed of the photosensitive chip. When the moving speed of the photosensitive chip is lower than the moving speed of the photosensitive chip (for example, when the weight of the lens is large), the movement distance of the photosensitive chip can occupy a larger proportion during setting of the fixed ratio. In this way, the characteristics of the fast moving speed of the photosensitive chip can be utilized, so that the photosensitive chip moves by a longer distance, and the lens and the photosensitive chip move to their respective image stabilization target positions substantially in the same time.

Further, in another embodiment of the present application, the first driving part may adopt a driving element with a large driving force and a suspension system with a large stroke. For example, the first driving part may be driven by an SMA (shape memory alloy) element. Compared with the traditional coil-magnet combination, the SMA element can provide a larger driving force with a smaller occupied space, so the first driving part can be designed to be more compact, facilitating the miniaturization of the camera module.

Figure 5:
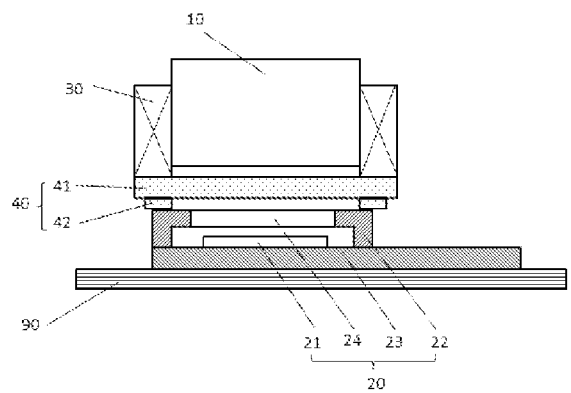
FIG. 5 shows a schematic sectional view of a camera module in an embodiment of the present application.

Further, FIG. 5 shows a schematic sectional view of a camera module in an embodiment of the present application. Referring to FIG. 5, in this embodiment, the basic portion of the second driving part 40 is fixed with the basic portion (not shown in FIG. 5) of the first driving part 30. The lens 10 may be mounted on a movable portion (e.g., a first motor carrier, which is not specifically shown in FIG. 5) of the first driving part 30. The photosensitive assembly 20 comprises a circuit board 23, a photosensitive chip 21, a lens holder 22, a filter 24, etc. The photosensitive assembly 20 may be mounted on a movable portion 42 of the second driving part 40. Specifically, the bottom surface of the movable portion 42 can be borne against the top surface of the lens holder 22 of the photosensitive assembly 20. In the second driving part 40, the second basic portion 41 and the second movable portion 42 can be elastically connected by means of a suspension system. In this embodiment, the suspension system allows the second movable portion 42 to translate relative to the second basic portion 41 in the xoy plane. Optionally, the suspension system may be a ball bearing system, the advantage of which is that in the z direction, the second movable portion 42 and the second basic portion 41 are in contact with each other through ball(s), the second movable portion 42 only moves in the xoy plane, and the movement in the optical axis direction can be blocked by the ball(s) between the second movable portion 42 and the second basic portion 41, so as to avoid affecting focusing of the camera module.

Optionally, in another embodiment, the suspension system may include an elastic element (such as a spring) through which the fixed portion and the movable portion are connected, which allows the movable portion to translate relative to the basic portion in the xoy plane, but prevents movement of the movable portion relative to the basic portion outside the xoy plane. Compared with the ball bearing system, the advantage of providing the elastic element is that the elastic element can provide an initial force between the basic portion and the movable portion, and the initial force can control the movement distance of the movable portion or maintain its position in cooperation with the driving force of the driving element, without additionally providing a driving element to provide a conjugate driving force so as to control the position of the movable portion. If the ball bearing system is used, the movable portion can move freely relative to the basic portion in the xoy direction without the driving force provided by the driving element, so it is often necessary to provide at least a pair of mutually opposite driving forces so that the movable portion can be controlled to remain in its initial position.

Further, still referring to FIG. 5, in one embodiment of the present application, image stabilization can be achieved by driving the entire photosensitive assembly 20 to move. At the same time, the circuit board 23, the photosensitive chip 21, the lens holder 22, and the optical filter 24 are packaged as a whole. The circuit board 23, the lens holder 22, and the optical filter 24 form a closed space. The photosensitive chip 21 is accommodated in the closed space, which improves the closure property of the photosensitive assembly 20, and ensures that the imaging of the photosensitive chip 21 is not affected by dust during the production or use of the camera module.

In this embodiment, still referring to FIG. 5, in an embodiment of the present application, the back of the circuit board can be directly borne against a terminal device (i.e., an electronic device equipped with the camera module, such as a mobile phone). Specifically, the back of the circuit board 23 can be borne against the main board of the terminal device or other bearing members 90. Although the second movable portion 42 is connected to the photosensitive assembly 20 and the second basic portion 41 is connected to the first driving part 30 in this embodiment, it should be understood that the movements of the second movable portion 42 and the second basic portion 41 are relative. In the image stabilization movement, the opposite movement directions mean that the movement direction of the movable portion of the first driving part relative to its basic portion is opposite to the movement direction of the movable portion of the second driving part relative to its basic portion.

Figure 6:
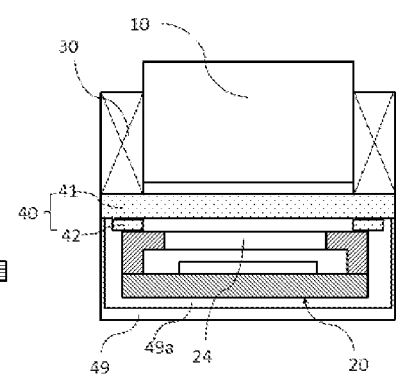
FIG. 6 shows a schematic sectional view of a camera module in another embodiment of the present application.

Further, FIG. 6 shows a schematic sectional view of a camera module according to another embodiment of the present application. Referring to FIG. 6, in this embodiment, a rear shell 49 is added below the second driving part 40, and the rear shell 49 is connected to the second basic portion 41 of the second driving part 40 to form an accommodating cavity. Both the second movable portion 42 of the second driving part 40 and the photosensitive assembly 20 are accommodated in the accommodating cavity. As shown in FIG. 6, there may be a gap 49a between the photosensitive assembly 20 and the bottom of the rear shell 49. That is, the photosensitive member 20 is suspended, and the photosensitive member 20 is only connected to the second movable portion 42 of the second driving part 40. In this embodiment, the rear shell 49 is directly supported on the terminal device. Since the rear shell 49 is connected to the terminal device, the second driving part 40 and the basic portion of the first driving part 30, during the image stabilization process, with the terminal device as a reference, the movable portions of the first driving part 30 and the second driving part 40 simultaneously drive the lens 10 and the photosensitive assembly 20 to move in opposite directions, respectively. Further, in this embodiment, the second movable portion 42 of the second driving part 40 is directly bonded to the upper end surface of the photosensitive assembly 20, so that the filter 24 can be separated from the external space, thereby preventing debris generated by friction or collision of the second movable portion 42 from falling directly on the surface of the color filter 24 when the second movable portion 42 moves relative to the second basic portion 41.

Figure 7:
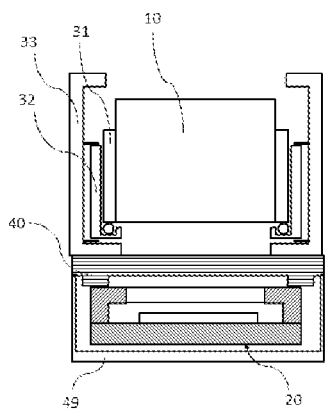
FIG. 7 shows a schematic sectional view of a camera module in still another embodiment of the present application.

FIG. 7 shows a schematic sectional view of a camera module in still another embodiment of the present application. Referring to FIG. 7, in this embodiment, the first driving part 30 is implemented to be adapted to drive the lens 10 to move in the optical axis direction to realize the focusing function, and also adapted to drive the lens 10 to move in the xoy plane to realize the image stabilization function. Optionally, the first driving part 30 comprises at least two carriers, which are a first carrier 31 and a second carrier 32, respectively. The lens 10 is borne against the first carrier 31, a suspension system is provided between the first carrier 31 and the second carrier 32, and a suspension system is provided between the second carrier 32 and a housing 33 of the first driving part 30. In this embodiment, the suspension system (i.e., a first suspension system) between the first carrier 31 and the second carrier 32 is set as a ball bearing system, and the suspension system (i.e., a second suspension system) between the second carrier 32 and the housing 33 is a suspension system based on an elastic element (such as a leaf spring). In this embodiment, the second suspension system is provided outside the first suspension system, the first suspension system allows the lens 10 and the first carrier 31 to translate in the xoy plane to realize the image stabilization function, and the second suspension system allows the lens 10, the first carrier 31 and the second carrier 32 to integrally move in the optical axis direction to realize the focusing function. Optionally, in another embodiment, the second suspension system may also be provided inside the first suspension system. In another modified embodiment, the second suspension system may also be provided below the first suspension system. In this embodiment, the suspension system refers to a system in which two components are movably connected, and the degrees of freedom (i.e., movement directions) of the relative movement of two components are limited to a certain extent. The two movably connected components may be referred to as a basic portion and a movable portion, respectively. Typically, a suspension system is used in cooperation with a driving element (such as an SMA element or a coil-magnet combination). A driving force is provided by the driving element, and under the action of the driving force, the movable portion moves relative to the basic portion in a movement direction defined by the suspension system.

Figure 8:
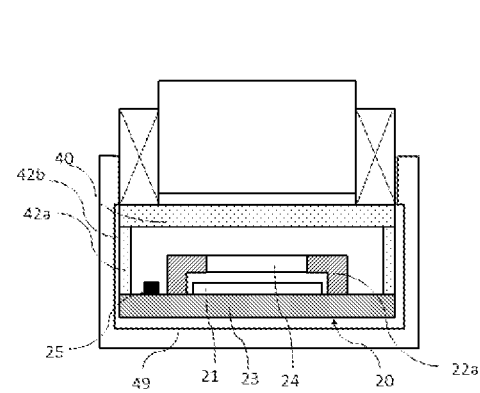
FIG. 8 shows a schematic sectional view of a camera module in yet another embodiment of the present application.

Further, FIG. 8 shows a schematic sectional view of a camera module in yet another embodiment of the present application. Referring to FIG. 8, the movable portion of the second driving part 40 in this embodiment may be provided with an extension arm 42a extending downward, and the extension arm 42a is bonded to the circuit board 23 of the photosensitive assembly 20. The extension arm 42a may be provided with an FPC board 42b, and the FPC board 42b may be directly welded to the circuit board 23, so that the driving element mounted on the movable portion and the circuit board 23 are electrically conducted. This embodiment can prevent the glue from flowing onto the filter when the photosensitive assembly 20 is bonded to the movable portion, thereby affecting the imaging. In addition, in this embodiment, there is a gap between the upper end surface (i.e., the top end) of the photosensitive element 20 and the second driving part 40, which can prevent the color filter from being scratched or broken.

Further, in some embodiments of the present application, an SMA element may be used to provide the second driving part with a driving force, so as to realize the controlled movement of the second movable portion relative to the second basic portion. Generally, the SMA element can provide a large driving force in a small occupied space. The second driving part of the SMA drive will be described below with reference to the drawings and an embodiment based on eight SMA wires.

Figure 9A:
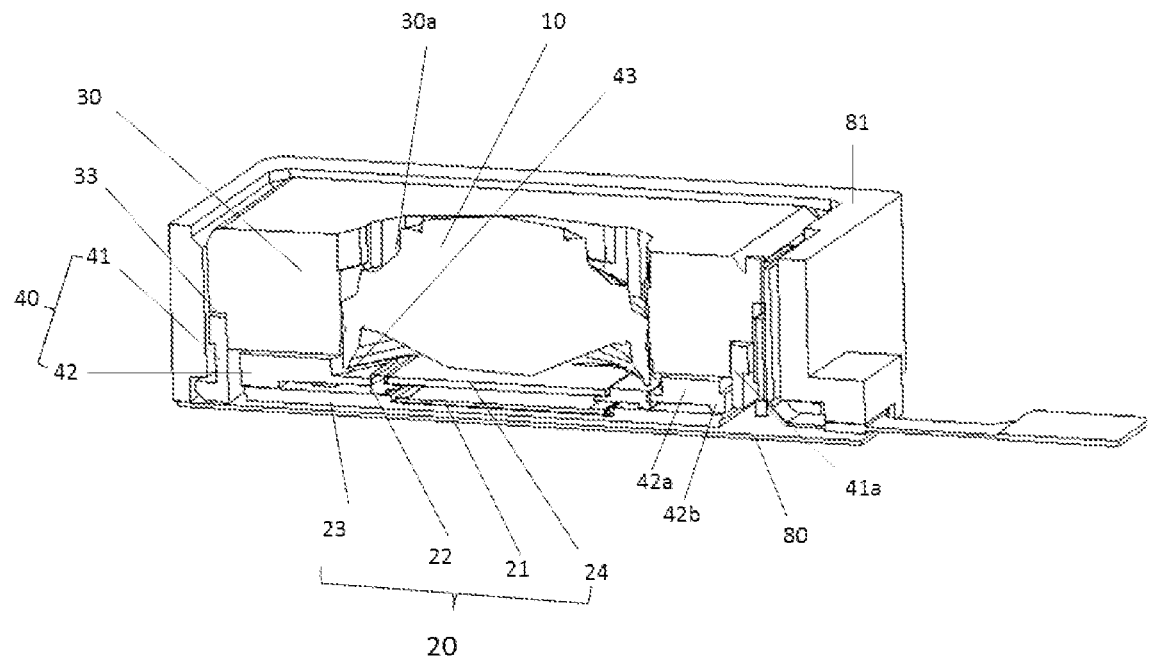
FIG. 9a shows a schematic perspective view of a camera module in an embodiment of the present application after being cut away.
Figure 9B:
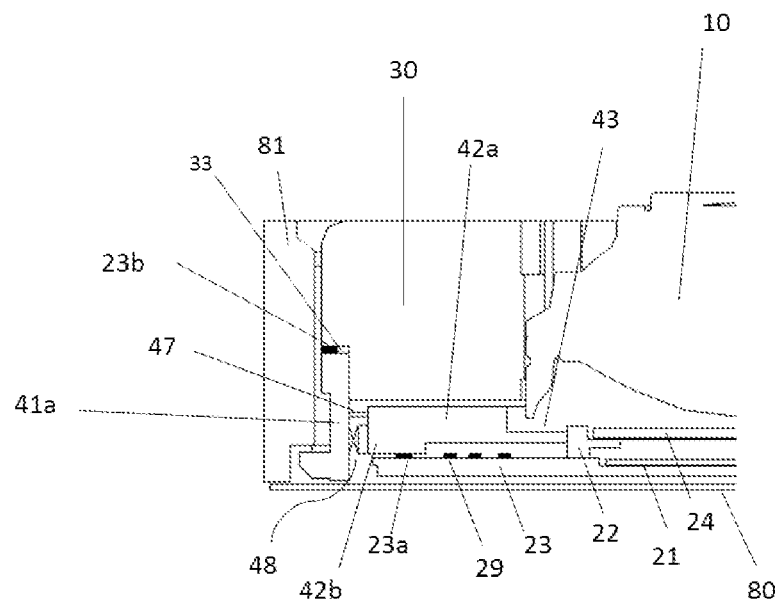
FIG. 9b shows a schematic sectional view of a camera module in an embodiment of the present application.

FIG. 9a shows a schematic perspective view of a camera module in an embodiment of the present application after being cut away. Referring to FIG. 9a, in this embodiment, the center of the first driving part has an accommodating hole 30a adapted to the outer side surface of the optical lens 10, so that the optical lens 10 is mounted in the accommodating hole 30a. The second driving part 40 is located below the first driving part 30. The second driving part 40 comprises a second basic portion 41 and a second movable portion 42. In this embodiment, the second basic portion 41 may be an annular frame structure. Specifically, the frame structure may be formed by an annular basic portion side wall 41a, and the basic portion side wall 41a may surround the second movable portion 42. The top surface of the basic portion side wall 41a may be bonded to the first driving part 30 by means of a second glue material 23b, so as to fix the second driving part 40 together with the first driving part 30. It should be noted that only the overall shape of the first driving part 30 is shown in FIG. 9a, and the first basic portion and the first movable portion are not shown separately. Generally, the first basic portion is located on the periphery of the first movable portion. In this embodiment, an edge area of the bottom surface of the first driving part (i.e., an edge area of the bottom surface of the first basic portion) may form a step-shaped notch 33, and the basic portion side wall 41a of the second basic portion 41 may extend upward and into the step-shaped notch 33. This design can enhance the structural strength of the second basic portion 41 so as to more reliably mount the SMA wire and the second movable portion 42 and the photosensitive assembly 20 suspended thereon. Further, this design also improves the rigidity of the connection between the second basic portion 41 and the first driving part 30, so that the movement of the second movable portion 42 is more stable and more accurate. Further, FIG. 9b shows a schematic sectional view of a camera module in an embodiment of the present application. Referring to FIGS. 9a and 9b in combination, in this embodiment, the bottom surface of the second movable portion 42 may be bonded to the circuit board 23 of the photosensitive assembly 20 through a first glue material 23a, so as to fix the photosensitive assembly 20 together with the second movable portion 42. There is a gap between the outer side surface of the second movable portion 42 and the inner side surface of the second basic portion 41 (i.e., the inner side of the basic portion side wall 41a), and the gap can be used for accommodating the SMA wire 48 and for accommodating a leaf spring 47 which supports the second movable portion 41. Specifically, the second basic portion 41 and the second movable portion 42 can be movably connected by means of a leaf spring 47 (the leaf spring may also be replaced with other elastic connecting portions). The SMA wire may also be connected between the second basic portion 41 and the second movable portion 42 to provide a driving force for the movement of the second movable portion 42.

Further, still referring to FIG. 9b, in an embodiment of the present application, the second movable portion 42 may comprise a movable portion main body 42a, the movable portion main body 42a is generally of a flat plate shape, and the center of the movable portion main body 42a has a through hole (i.e., a light-passing hole) to allow the light used for imaging to pass through. The outer edge area of the bottom surface of the movable portion main body 42a extends downward to form a movable portion side wall 42b, and the bottom surface of the movable portion side wall 42b is bonded to the upper surface of the circuit board 23. An accommodating cavity is formed between the inner side surface of the movable portion side wall 42b, the bottom surface of the movable portion main body 42a, the upper surface of the circuit board 23 and the outer side surface of the lens holder 22, and the accommodating cavity can be used for arranging electronic elements 29. The electronic elements 29 comprise a resistor, a capacitor, etc. These electronic elements 29 may form circuits of the circuit board together with the wiring in the circuit board 23.

Further, still referring to FIG. 9b, in an embodiment of the present application, the inner side edge of the movable portion main body has a step-shaped notch 43, so as to avoid the optical lens 10, so that the optical lens 10 can have a greater movement range (i.e., having a larger focusing stroke or image stabilization stroke).

Figure 10A:
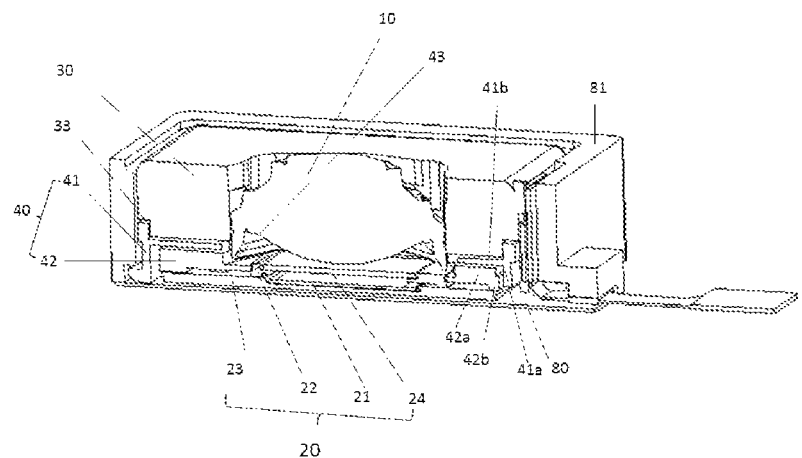
FIG. 10a shows a schematic perspective view of a camera module in another embodiment of the present application after being cut away.
Figure 10B:
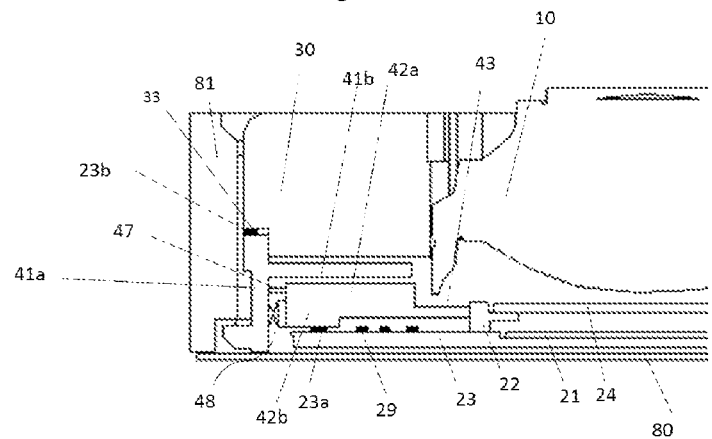
FIG. 10b shows a schematic sectional view of a camera module in another embodiment of the present application.

Further, FIG. 10a shows a schematic perspective view of a camera module in another embodiment of the present application after being cut away. FIG. 10b shows a schematic sectional view of a camera module in another embodiment of the present application. Referring to FIGS. 10a and 10b in combination, in this embodiment, the second basic portion comprises a basic portion side wall 41a and a base 41b. The base 41b is generally of a flat plate shape, and the center of the flat plate-like base 41b has a through hole to avoid the imaging light path. In this embodiment, the base 41b may be located above the second movable portion 42. The base 41b and the basic portion side wall 41a may be integrally molded. The basic portion side wall 41a may surround the second movable portion 42. The top surface of the basic portion side wall 41a may be bonded to the first basic portion to fix the second driving part 40 together with the first driving part 30.

Figure 11A:
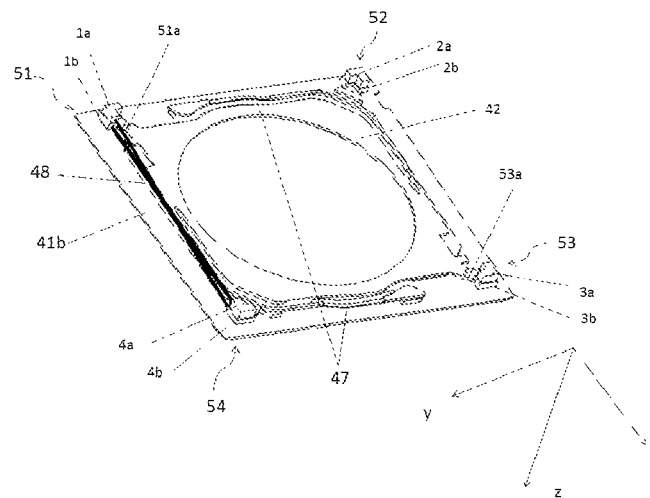
FIG. 11a shows a schematic view of the three-dimensional structure of a second driving part shown in FIGS. 10a and 10b.
Figure 11B:
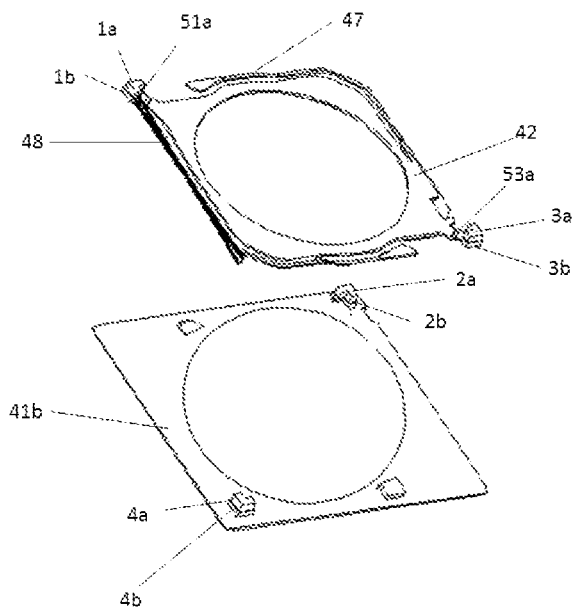
FIG. 11b shows an exploded perspective view of FIG. 11a, FIG. 12 shows a schematic view of the connection of SMA wires of a second driving part in an embodiment of the present application.
Figure 12:
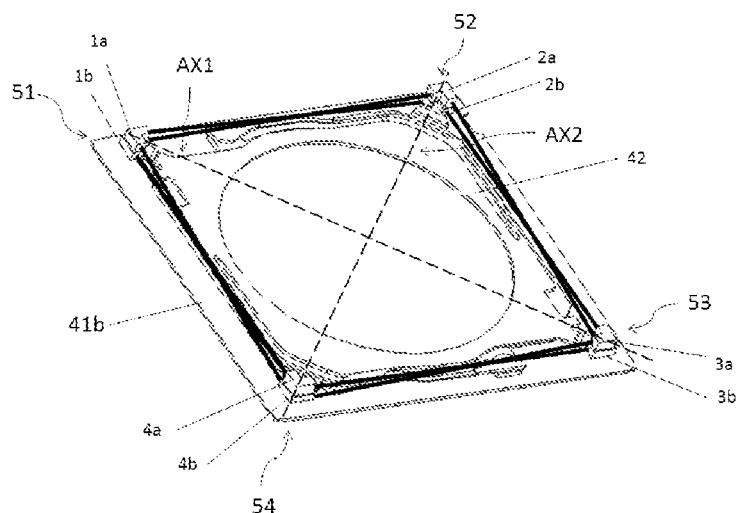

Further, FIG. 11a shows a schematic view of the three-dimensional structure of a second driving part shown in FIGS. 10a and 10b. FIG. 11 is a schematic view after being turned upside down. The second movable portion 42 is placed above the base 41b, so that the detailed structure of the second movable portion can be more easily observed. In FIGS. 10a and 10b, the second movable portion 42 is located below the base 41b. FIG. 11b shows an exploded perspective view of FIG. 11a. FIG. 12 shows a schematic view of the connection of the SMA wire of the second driving part in an embodiment of the present application. Referring to FIGS. 11a, 11b and 12, in an embodiment of the present application, the second driving part 40 comprises eight SMA wires 48, and the eight SMA wires 48 may be fixed on eight fixed ends located at the second basic portion 41 and the second moving portion 42, respectively. Specifically, the second driving part 40 has a generally rectangular outer contour in a plan view, and four corner areas of the rectangular outer contour may be denoted as a first corner 51, a second corner 52, a third corner 53 and a fourth corner 54, respectively. The first corner 51 and the third corner 53 are located on one diagonal line AX1, and the second corner 52 and the fourth corner 53 are located on the other diagonal line AX2 (refer to FIG. 12 in combination). In this embodiment, the movable portion main body 42a of the second movable portion 42 may extend outward at the positions of the first corner 51 and the third corner 53, respectively, to form a first extension portion 51a and a third extension portion 53a. The first extension portion 51a may be provided at a first A fixed end 1a and a first B fixed end 1b, wherein the first B fixed end 1b may be mounted or formed on the upper surface of the first extension portion 51a (here, it may be formed in an integral molding manner, which will not be described in detail below), the first A fixed end 1a may be located above the first B fixed end 1b, and the first A fixed end 1a and the first B fixed end 1b may be isolated by an insulating material, so as to prevent short circuit of the circuit for driving the SMA wires to work. Similarly, the third extension portion 53a may be provided at a third A fixed end 3a and a third B fixed end 3b, wherein the third B fixed end 3b may be mounted or formed on the upper surface of the third extension portion 53a, the third A fixed end 3a may be located above the third B fixed end 3b, and the third A fixed end 3a and the third B fixed end 3b may be isolated by an insulating material, so as to prevent short circuit of the circuit for driving the SMA wires to work. Further, the movable portion main body 42a may also be designed with a gap at each of the positions of the second corner 52 and the fourth corner 54, so as to avoid the functional structure of the second basic portion 41 at the second corner 52 and the fourth corner 54. Here, the functional structures of the second basic portion 41 at the second corner 52 and the fourth corner 54 refer to a second A fixed end 2a, a second B fixed end 2b, a fourth A fixed end 4a and a fourth B fixed end 4b located on the second basic portion 41. Specifically, the second A fixed end 2a and the second B fixed end 2b may be provided at the position of the second corner 52 of the second basic portion 41, wherein the second B fixed end 2b may be mounted or formed on the upper surface of the second corner 52 area of the base 41b, the second A fixed end 2a may be located above the second B fixed end 2b, and the second A fixed end 2a and the second B fixed end 2b may be isolated by an insulating material. A fourth A fixed end 4a and a fourth B fixed end 4b may be provided at the position of the fourth corner 54 of the second basic portion 41, wherein the fourth B fixed end 4b may be mounted or formed on the upper surface of the fourth corner 54 area of the base 41b, the fourth A fixed end 4a may be located above the fourth B fixed end 4b, and the fourth A fixed end 4a and the fourth B fixed end 4b may be isolated by an insulating material. It should be noted that in this paragraph, the above and below are based on FIGS. 11a, 11b and 12, and these figures are inverted, that is, the below is an object side. In FIGS. 10a and 10b, the above and below need to be interchanged, that is, in FIGS. 10a and 10b, the above is the object side. Further, in this embodiment, eight SMA wires are fixed between the above eight fixed ends, respectively. The first A fixed end is connected to the fourth B fixed end through an SMA wire, and for ease of description, the SMA wire is denoted as wire 1a-4b; the first B fixed end is connected to the fourth A fixed end through an SMA wire, and for ease of description, the SMA wire is denoted as wire 1b-4a; the first A fixed end is connected to the second B fixed end through an SMA wire, and for ease of description, the SMA wire is denoted as wire 1a-2b, the B fixed end is connected to the second A fixed end through an SMA wire, and for ease of description, the SMA wire is denoted as wire 1b-2a, the second A fixed end is connected to the third B fixed end through an SMA wire, and for ease of description, the SMA wire is denoted as wire 2a-3b; the second B fixed end is connected to the third A fixed end through an SMA wire, and for ease of description, the SMA wire is denoted as wire 2b-3a; the third A fixed end is connected to the fourth fixed end B through an SMA wire, and for ease of description, the SMA wire is denoted as wire 3a-4b; and the third fixed end B is connected to the fourth fixed end A through an SMA wire, and for ease of description, the SMA wire is denoted as wire 3b-4a. In FIGS. 11a, 11b and 12, in order to avoid occlusion, only two SMA wires are shown, namely, wire 1a-4b and wire 1b-4a. All eight SMA wires are shown in FIG. 12. Referring to FIGS. 11 and 12, in this embodiment, two interlaced SMA wires are arranged on each of the four side surfaces of the second driving part, and an electric current is selectively applied to all or part of the SMA wires, so that all or part of the SMA wires can shrink, thereby driving the second movable portion to move in a set degree of freedom.

Specifically, the manner of driving the second movable portion to move may comprise translational driving in the xoy plane, Rz-degree-of-freedom driving, tilting driving (i.e., Rx and Ry-degree-of-freedom driving), and z-axis translational driving. In this embodiment, each of the above fixed ends located at the positions of four corners is not only a fixed end of the mechanical connection of the SMA wire, but also a connection terminal of the electrical connection of the SMA wire. SMA is the English abbreviation of shape memory alloy. After the electric current is applied to the SMA wire, the SMA wire can shrink under the effect of the shape memory alloy, thereby playing the effect of driving the second movable portion to move. The greater the amount of electric current applied, the greater the shrinkage of the SMA wire. The electric current applied to the SMA wire may also be referred to as the driving current of the SMA wire. Based on the above driving principles, the four types of driving manners will be described individually below.

Translation driving in the xoy plane: when the wire 1a-2b and wire 1b-2a shrink synchronously (the two can shrink by the same amount) and wire 1a-4b and wire 1b-4a shrink synchronously (the two can shrink by the same amount), the second movable portion 42 can be driven to translate along the first diagonal line AX1 in the xoy plane; and when wire 1a-2b and wire 1b-2a shrink synchronously (the two can shrink by the same amount), and wire 2a-3b and wire 2b-3a shrink synchronously (the two can shrink by the same amount), the second movable portion 42 can be driven to translate along the second diagonal line AX2 in the xoy plane. In this embodiment, the translation of the first diagonal line AX1 and the second diagonal line AX2 may be perpendicular to each other, so that the direction of the first diagonal line AX1 and the direction of the second diagonal line AX2 form two components of a displacement vector in the xoy plane. By controlling the magnitudes of the two components, the displacement vector in any direction in the xoy plane can be constructed. When the first driving part drives the lens to translate in the x-axis and y-axis directions, the x-axis and y-axis components of the translation motion determine the movement direction of the lens in the xoy plane, which is referred to as a first direction for the ease of description. By controlling the magnitudes of the components of the photosensitive chip in the direction of the first diagonal line AX1 and the direction of the second diagonal line AX2, a displacement vector in a second direction opposite to the first direction can be constructed, so that the photosensitive chip can move in the xoy plane in the direction (i.e., the second direction) opposite to the translation direction of the lens.

It should be noted that, in the present application, the combined driving of the SMA wires for realizing the translational driving of the photosensitive chip in the xoy plane is not limited to the above driving manner. For example, the translation in the direction of the first diagonal line AX1 may also be realized by driving wire 2a-3b and wire 2b-3a to synchronously shrink (the two can shrink by the same amount) and driving wire 3a-4b and wire 4a-3b to synchronously shrink (the two can shrink by the same amount); and the translation in the direction of the second diagonal line AX2 may also be realized by driving wire 1a-4b and wire 1b-4a to synchronously shrink (the two can shrink by the same amount) and driving wire 3a-4b and wire 4a-3b to synchronously shrink (the two can shrink by the same amount). In a nutshell, when the four SMA wires on the two adjacent sides of the second driving part synchronously shrink, the translation on the direction of one diagonal line can be realized. The translation in the directions of two diagonal lines is simultaneously driven, and the displacement vector in any direction in the xoy plane can be constructed by different linear combinations of the translation amounts in the directions of two diagonal lines, so that the movement direction of the photosensitive chip in the xoy plane is opposite to the movement direction of the lens in the xoy plane.

Rz-degree-of-freedom driving: wire 1a-2b and wire 1b-2a synchronously shrink (the two can shrink by the same amount), and wire 3a-4b and wire 3b-4a synchronously shrink (the two can shrink by the same amount), so that the second movable portion can be driven to rotate in the xoy plane relative to the second basic portion, that is, to rotate around the z-axis; and when the other four wires are driven, that is, wire 2a-3b and wire 2b-3a synchronously shrink (the two can shrink by the same amount), and wire 1a-4b and wire 1b-4a synchronously shrink (the two can shrink by the same amount), so that the movable portion can be driven to rotate around the z-axis in the opposite direction relative to the second basic portion. For example, it is assumed that the second movable portion rotates clockwise around the z-axis relative to the second basic portion when a former set of SMA wires is powered on, and the second movable portion rotates counterclockwise around the z-axis relative to the second basic portion when a latter set of SMA wires is powered on. The former set of SMA wires refers to wires 1a-2b, 1b-2a, 3a-4b and 3b-4a, and the latter set of SMA wires refers to wires 1a-4b, 1b-4a, 2a-3b and 2b-3a.

Tilt driving: Tilt driving may also be referred to as tilt driving, i.e., driving on the two rotational degrees of freedom, Rx and Ry. When wire 1a-2b is applied with an electric current and shrinks, the second movable portion can rotate in the Ry direction relative to the second basic portion, that is, rotate around the y-axis. When wire 1a-4b is applied with an electric current and shrinks, the second movable portion can rotate in the Rx direction relative to the second basic portion, that is, rotate around the x-axis. Wires 1a-2b and 1a-4b line can be simultaneously applied with electric currents and shrink, and the shrinkage amounts of the two may be the same or different. By applying electric currents of different magnitudes, the shrinkage amounts of wires 1a-2b and 1a-4b can be changed, so that the displacement vector of the second movable portion (i.e., the displacement vector of the photosensitive chip) has different magnitudes of Rx and Ry components. In this embodiment, the tilt drive of the second driving part can be driven by the SMA wire combination to adjust the tilt angle (i.e., tilt) of the photosensitive chip, thereby compensating for the tilt of the image plane of the camera module, and further improving the imaging quality.

Z-axis translational driving: when four SMA wires 1a-2b, 1a-4b, 2b-3a and 3a-4b simultaneously shrink and their shrinkage amounts are the same, the second movable portion can be driven to translate in a z-axis direction relative to the second basic portion, and the translation of the second movable portion in the z-axis direction can be used in combination with the translation degree of freedom in the z-axis direction of the first driving part, thereby helping to improve the focusing speed of the camera module and increase the focusing range of the camera module. Specifically, during the focusing process, the first driving part can drive the optical lens to move along the z-axis, and the second driving part can drive the photosensitive assembly to move in the opposite direction (opposite to the movement direction of the lens) along the z-axis, thus improving the focusing speed. On the other hand, the movement stroke of the relative movement of the optical lens and the photosensitive chip in the z-axis direction can also be increased, thereby increasing the focusing range of the camera module.

The implementations of translational driving, Rz-degree-of-freedom driving, tilt driving (i.e., Rx and Ry-degree-of-freedom driving) and z-axis translational driving in the xoy plane are described above with reference to a specific embodiment. However, it should be noted that the implementations of the present application are not limited to the above embodiments. More generally, in some embodiments of the present application, the external shape of the second driving part is generally rectangular, and its four corner areas comprise a first corner, a second corner, a third corner and a fourth corner, wherein the first corner and the third corner are located on the first diagonal line of the second driving part, and the second corner and the fourth corner are located on the second diagonal line of the second driving part. The second movable portion extends outward at each of the positions of the first corner and the third corner to form a first extension portion and a third extension portion. The two fixed ends of the first corner of the second driving part are provided on the first extension portion, and the two fixed ends of the third corner of the second driving part are provided on the third extension portion. The two fixed ends of the second corner of the second driving part are provided at the second corner of the second basic portion, and the two fixed ends of the fourth corner of the second driving part are provided at the fourth corner of the second basic portion. For each side surface of the second driving part, the two interlaced SMA wires provided on the side surface are fixed and electrically connected to the four fixed ends located in the two corner areas of the side surface.

In some embodiments of the present application, for the movement degrees of freedom of the movement in the xoy plane, the translational component of the photosensitive chip in the direction of the first diagonal line or in the direction of the second diagonal line may be generated by driving two pairs of interlaced SMA wires on two intersecting side surfaces of the second driving part to shrink; and the translational component in the direction of the first diagonal line is combined with the translational component in the direction of the second diagonal line, so that the movement direction of the photosensitive chip in the xoy plane is opposite to the movement direction of the lens. Two intersecting side surfaces are grouped into one group, so that four groups can be summarized. Two pairs of interlaced SMA wires (four in total) of any group of side surfaces shrink, so that either a translational component of the photosensitive chip in the direction of the first diagonal line or a translational component of the photosensitive chip in the direction of the second diagonal line can be generated. All the interlaced SMA wires on at least two groups of side surfaces that generate translation components in different diagonal directions shrink (the shrinkage amounts corresponding to different translational components may be different), so that the translational component in the direction of the first diagonal line or the translational component in the direction of the second diagonal line are combined into a translation direction of the photosensitive chip at any angle in the xoy plane.

Further, in some embodiments, for the Rz-degree-of-freedom driving, the rotation of the photosensitive chip in an Rz direction is generated by driving two pairs of interlaced SMA wires on two opposite side surfaces of the second driving part to shrink, wherein the Rz direction is a direction of rotation around a z-axis, and the z-axis is a coordinate axis parallel to the optical axis.

Further, in some embodiments, for the tilt driving, the rotation component of the photosensitive chip in an Rx or Ry direction is generated by driving a single SMA wire on a single side surface of the second driving part to shrink; wherein the Rx direction is a direction of rotation around the x-axis, and the Ry direction is a direction of rotation around the y-axis.

Further, in some embodiments, for the translational driving on the z-axis direction, the translation of the photosensitive chip in the z-axis direction is generated by driving a first group of SMA wires and a second group of SMA wires of the second driving part to shrink; and the translation direction of the photosensitive chip in the z-axis direction is opposite to the translation direction of the lens in the z-axis direction, wherein the z-axis is a coordinate axis parallel to the optical axis; wherein the first group of SMA wires are two SMA wires with a first common fixed end, and the two SMA wires are located on two intersecting side surfaces of the second driving part, respectively; the second group of SMA wires are the other two SMA wires with a second common fixed end, and the other two SMA wires are located on the other two intersecting sides of the second driving part; and each of the first common fixed end and the second common fixed end is one of eight fixed ends of the second driving part, and the first common fixed end and the second common fixed end are located at the same height.

It should be noted that when tilt adjustment is not required, the four type-A fixed ends described previously may be at different heights, and the four type-B fixed ends may be at different heights. For example, when the second driving part only needs to achieve translation in the xoy plane, it is only required that the two type-A fixed ends on the same diagonal line are at the same height, and the two type-B fixed ends on the same diagonal line are at the same height. Specifically, the type-A fixed ends of the first corner and the third corner are at the same height, and the type-A fixed ends of the second corner and the fourth corner are at the same height. Two type-A fixed ends of adjacent corner areas (i.e., two corner areas that are not on the same diagonal line) may not be at the same height, and two type-B fixed ends of adjacent corner areas (i.e., two corner areas that are not on the same diagonal line) may not be at the same height.

It should be noted that, in the above embodiment, the eight fixed ends are provided as follows: in any one of the corner areas, the two fixed ends are arranged along the optical axis direction. In this case, the two interlaced SMA wires are approximately in an xoz plane or a yoz plane (the z-axis is a coordinate axis parallel to the optical axis), that is, the two fixed ends of the corner area are arranged vertically (for example, one fixed end is located directly above the other fixed end). Herein, the interlacing of two SMA wires means that the projections of the two SMA lines in the xoz plane or the yoz plane cross, but the two SMA wires are not in direct contact during actual production (the two are slightly staggered to avoid direct contact) to avoid mutual interference when the two SMA wires shrink, resulting in a decrease in the accuracy of position adjustment.

The four fixed ends of any two adjacent corner areas are all located in a plane parallel to the xoy plane. For example, in any one of the corner areas, one fixed end is located on an outer side of the other fixed end. Here, the outer side refers to a side away from the photosensitive center of the photosensitive chip, and the inner side refers to a side toward the photosensitive center of the photosensitive chip. This arrangement can effectively utilize the space of the photosensitive assembly in the height direction (z-axis direction), so the height of the camera module will not be increased. At the same time, the space in the x-axis and y-axis directions of the camera module can be saved, thereby reducing the lateral dimension of the camera module. That is, the photosensitive chip can be adjusted in multiple degrees of freedom of movement at a small volume cost. However, it should be noted that the arrangement of the eight fixed ends in the present application is not limited to this. In some embodiments of the present application, the eight fixed ends may also be arranged so that the four fixed ends of any two adjacent corner areas are all located in a plane parallel to the xoy plane.

In some embodiments of the present application, the lens and the first driving part may be assembled into a first combined body, the photosensitive assembly and the second driving part may be assembled into a second combined body, and then the first combined body and the second combined body are bonded based on an active alignment process (AA process).

Further, in an embodiment of the present application, the glue material for bonding in the AA process may be arranged between the second basic portion and the first basic portion. Specifically, referring to FIGS. 9a and 9b in combination, in this embodiment, the edge area of the bottom surface of the first driving part (i.e., the edge area of the bottom surface of the first basic portion) may form a step-shaped notch 33, and the basic portion side wall 41a of the second basic portion 41 may extend upward and into the step-shaped notch 33. The glue material for bonding the first combined body and the second combined body may be arranged between the step-shaped notch 33 and the top surface of the basic portion side wall 41a. This design helps to prevent the AA glue material from overflowing and contaminating the imaging optical path (AA process bonding may require a large amount of glue material, so there may be a risk of overflowing at the position of the applied glue), thereby preventing the problem of photo stains on the camera module.

Further, in an embodiment of the present application, the second basic portion may comprise a base 41b and a basic portion side wall 41a, and the second movable portion 42 may be located below the base (refer to FIGS. 10a and 10b). Under this design solution, when the first combined body and the second combined body are bonded using the AA process, the photosensitive assembly 20 mounted on the second movable portion 42 can be protected by the base 41b, which thus helps to prevent the AA glue material from overflowing and contaminating the imaging optical path, thereby preventing the problem of photo stains on the camera module. In addition, in this embodiment, the glue material for bonding the first combined body (the first basic portion) and the second combined body (the second basic portion) may also be arranged between the step-shaped notch 33 and the top surface of the basic portion side wall 41a, so as to further prevent the problem of photo stains on the camera module caused by the overflow of AA glue material.

Further, in some embodiments of the present application, the eight fixed ends for mounting the eight SMA wires may be mounted on the surface of the base, or may be mounted on the inner side surface of the basic portion side wall.

Further, in the camera module, the circuit board of the photosensitive assembly usually comprises a rigid circuit board main body and a flexible connecting band, one end of the flexible connecting band is connected to the circuit board main body, and the other end is connected and electrically conducted with a motherboard or other components of an electronic device through a connector. In the prior art, the flexible connecting band of the photosensitive assembly is usually led out from the side surface of the circuit board main body, and the flexible connecting band is roughly parallel to the surface of the circuit board main body. In this arrangement, the flexible connecting band will have a greater resistance to the movement of the circuit board main body, which may increase the force required to drive the movement of the circuit board main body, resulting in insufficient stroke for image stabilization compensation and reduced response speed. In addition, the resistance caused by the connecting band is irregular, so that it is difficult for the second driving part to compensate for the resistance, which may result in a decrease in the accuracy of the image stabilization compensation. Therefore, in this embodiment, a suspended circuit board is provided as a circuit board of a photosensitive assembly adapted to the second driving part, and this design manner will help to overcome the above defects caused by the connecting band.

Figure 13:
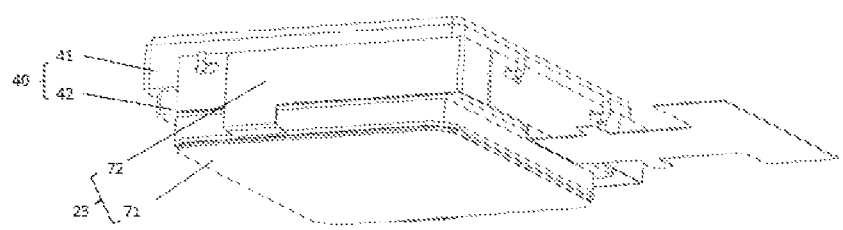
FIG. 13 shows a schematic perspective view of a second driving part and a photosensitive assembly in an embodiment of the present application after being assembled.
Figure 14:
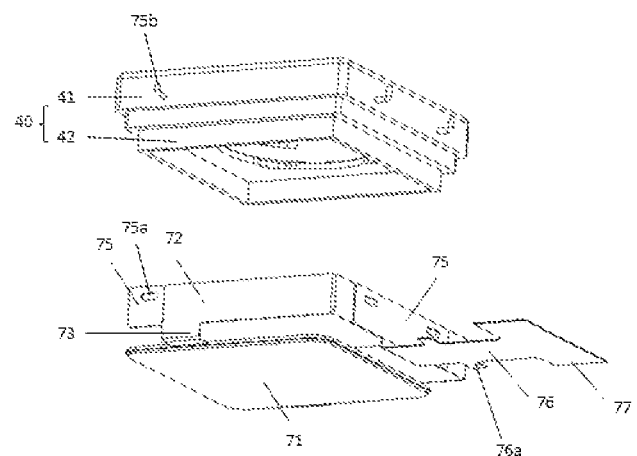
FIG. 14 shows an exploded schematic view of a second driving part and a photosensitive assembly in an embodiment of the present application.
Figure 15:
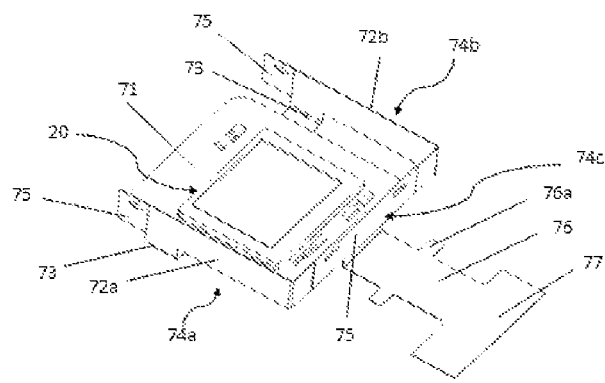
FIG. 15 shows a schematic perspective view of a photosensitive assembly and a suspended circuit board used by the same in an embodiment of the present application.

FIG. 13 shows a schematic perspective view of a second driving part and a photosensitive assembly in an embodiment of the present application after being assembled. FIG. 14 shows an exploded schematic view of a second driving part and a photosensitive assembly in an embodiment of the present application. FIG. 15 shows a schematic perspective view of a photosensitive assembly and a suspended circuit board used by the same in an embodiment of the present application. Referring to FIGS. 13, 14 and 15, in the camera module of the embodiment, the photosensitive assembly 20 is connected to the second movable portion 42 of the second driving part 40, so the circuit board main body 71 can move in the xoy plane under the drive of the second movable portion 42. The circuit board 23 of this embodiment is designed to be a suspended structure. Specifically, the circuit board 23 comprises a rigid circuit board main body 71 and a flexible connecting band 72, and the connecting band 72 may comprise a third connecting band 72a and a fourth connecting band 72b. The third connecting band 72a and the fourth connecting band 72b may be led out from two opposite side surfaces of the circuit board main body 71 (for ease of description, the two opposite side surfaces may be referred to as a first side surface 74a and a second side surface 74b), respectively, and may be bent upward. The bent third connecting band 72a and the fourth connecting band 72b can form suspension portions 75, respectively. The suspension portion 75 may be connected to the basic portion of the second driving part 40 (or the first driving part 30) to form a suspension structure. The suspending structure allows the basic portion to suspend the circuit board main body 71 and various components mounted on the surface thereof through the bent portion 73 of the flexible connecting band 72 (i.e., suspending the photosensitive assembly 20). Specifically, in one example, the suspension portion 75 may have a through hole (a suspension hole 75a), the second basic portion 41 of the second driving part 40 may have a corresponding hook 75b, and the hook 75b is hooked to the through hole of the suspension portion 75 to connect the suspension portion 75. In the prior art, the connecting band and the circuit board main body are usually in the same plane, and at this time, the deflection of the connecting band relative to the circuit board main body in the same plane will generate a greater resistance. In this embodiment, the connecting position of the connecting band 72 and the circuit board main body 71 is provided with a bent portion 73 formed by bending upward. At this time, the resistance produced by the connecting band 72 relative to the circuit board main body 71 in the xoy plane (which may be regarded as a horizontal plane) is relatively small.

Further, in an embodiment of the present application, the third connecting band 72a and the fourth connecting band 72b may extend along the periphery of the circuit board main body 71 and the photosensitive assembly 20, so that the connecting band 72 surrounds the photosensitive assembly on at least three side surfaces. Moreover, the third connecting band 72a and the fourth connecting band 72b are connected and electrically conducted with each other. The photosensitive assembly 20 has a first side surface 74a and a second side surface 74b which are at the same positions as those of the circuit board main body 71. The first side surface 74a and the second side surface 74b are arranged opposite to each other (that is, they do not intersect with each other), and the third side surface 74c of the photosensitive assembly 20 intersects both the first side surface 74a and the second side surface 74b. The connecting band 72 may surround the first side surface 74a, the second side surface 74b and the third side surface 74c of the photosensitive assembly 20. The third connecting band 72a is led out from the first side surface 74a of the circuit board main body 71 and bent upward to form the bent portion 73, then extends along the first side surface 74a of the photosensitive assembly 20, is bent in the horizontal direction at a corner and continues to extend along the third side surface 74c. The fourth connecting band 72b is led out from the second side surface 74b of the circuit board main body 71 and bent upward to form another bent portion 73, then extends along the second side surface 74b of the photosensitive assembly 20, is bent horizontally at a corner and continues to extend along the third side surface 74c. The third connecting band 72a and the fourth connecting band 72b can be joined at the third side surface 74c and electrically conducted with each other, so as to form a complete connecting band 72. Three connecting band sections located on the first side surface 74a, the second side surface 74b and the third side surface 74c may each have at least one suspension portion 75. Each suspension portion has at least one through hole for facilitating the connection with the basic portion of the second driving part 40 (or the first driving part 30). In this embodiment, the suspension portion 75 can suspend the circuit board main body 71 through the bent portions 73 located on opposite sides of the circuit board main body 71, so that when the circuit board main body 71 is driven by the second driving part 40 to move, the bent portion 73 and the connecting band 72 can be bent and deformed to meet the movement stroke of the circuit board main body 71.

Further, in an embodiment of the present application, the suspension portions 73 of the three connecting band sections located on the first side surface 74a, the second side surface 74b and the third side surface 74c may all be made of rigid substrates for reinforcement. For example, a rigid substrate may be attached to a partial area of the flexible connecting band to form the suspension portion 73. However, other areas of the flexible connecting band are still in a flexible state so as to be able to be bent and deformed, so as to meet the movement stroke of the circuit board main body 71.

Further, in an embodiment of the present application, the connecting band section located on the third side surface 74c may have a rigid suspension portion 75c, and the suspension portion 75c may lead out a fifth connecting band 76. The fifth connecting band 76 can be used to connect to a motherboard of an electronic device (e.g., a mobile phone).

Further, in another embodiment of the present application, the suspension portion may also be connected to an outer bracket (not shown in the figure), and the outer bracket is directly or indirectly fixed with the basic portion of the second driving part together. In the present application, the suspension portion may be fixed together with the basic portion of the second driving part through other intermediate objects. The intermediate object may be directly or indirectly fixed to the basic portion of the second driving part. The intermediate object has a hook to be hooked to the suspension portion, or the intermediate object is bonded to the suspension portion. The intermediate object may be an outer bracket, the basic portion of the first driving part, or other intermediate objects.

Further, in another embodiment of the present application, the suspension portion may not have the through hole. In this embodiment, the suspension portion may be fixed together with the basic portion of the second driving part (or with the basic portion of the first driving part or the outer bracket) by means of bonding. Further, in another embodiment of the present application, the third connecting band and the fourth connecting band may be rigid-flex boards, wherein a part forming the suspension portion may adopt a rigid board, and both a part of connecting the suspension portion and a bent portion formed by bending upward can adopt flexible boards. Since the suspension portion is directly formed by a rigid board, in this embodiment, the suspension portion can no longer be attached to a rigid substrate for reinforcement.

Further, in an embodiment of the present application, the circuit board main body, the third connecting band, and the fourth connecting band may be composed of a complete rigid-flex board.

Further, still referring to FIGS. 13, 14 and 15, in an embodiment of the present application, the circuit board may further have a fixing portion 76a for fixing the fifth connecting band 76. This design can prevent the circuit board main body 71, the third connecting band 72a and the fourth connecting band 72b from being affected by external factors.

Figures 16A, 16B:
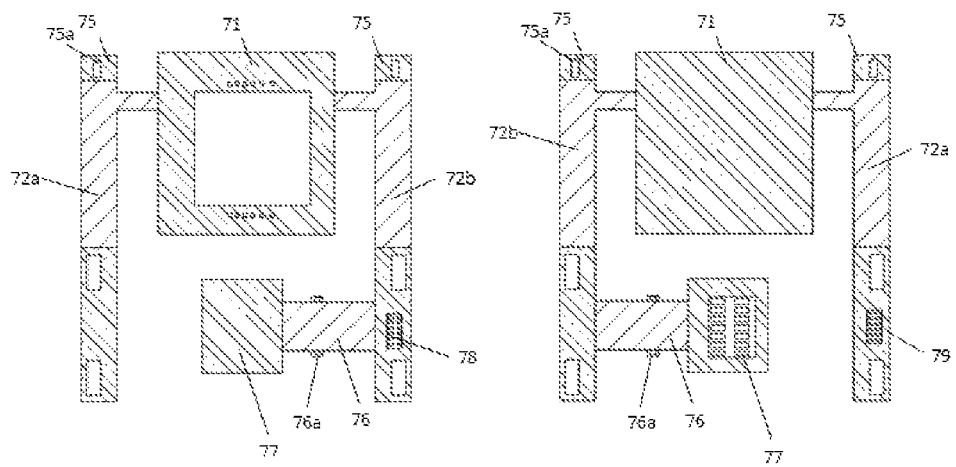
FIG. 16a shows a schematic front view of a suspended circuit board in an embodiment of the present application after being unfolded.
FIG. 16b shows a schematic rear view of a suspended circuit board in an embodiment of the present application after being unfolded.

Further, FIG. 16a shows a schematic front view of a suspended circuit board in an embodiment of the present application after being unfolded, and FIG. 16b shows a schematic rear view of a suspended circuit board in an embodiment of the present application after being unfolded. Referring to FIGS. 16a and 16b, in this embodiment, the circuit board 23 may be composed of a rigid-flex board. Sections of the third connecting band 72a and the fourth connecting band 72b located on the third side surface 74c can be fastened to each other through connectors 78 and 79 (refer to FIG. 15 in combination), so that the third connecting band 72a and the fourth connecting band 72b are connected and fixed, and further electrically connected. The third connecting band 72a and the fourth connecting band 72b are both provided with circuits, so as to lead out a circuit in the circuit board main body 71 and connect to external circuits through the fifth connecting band 76 and its connector 77. Since the third connecting band 72a and the fourth connecting band 72b can each lead out a part of the circuit through corresponding bent portions 73 formed by bending upward, the circuit required to be led out from each bent portion 73 can be reduced. In this way, the width of each bent portion 73 can be reduced, so as to further reduce the resistance formed by the flexible connecting band 72 to the movement of the circuit board main body 71, thereby reducing the driving force required to be provided by the second driving part 40. It should be noted that, in other embodiments of the present application, the circuit of the circuit board main body may also be led out through only one of the bent portions (for example, the upwardly bent bent portion of the third connecting band or the upwardly bent bent portion of the fourth connecting band).

Further, FIG. 17a shows a schematic front view of a suspended circuit board in another embodiment of the present application after being unfolded, and FIG. 17b shows a schematic rear view of a suspended circuit board in an embodiment of the present application after being unfolded. Referring to FIGS. 17a and 17b, the photosensitive assembly 20 comprises a suspended circuit board, and the suspended circuit board comprises a rigid circuit board main body 71 and a flexible connecting band 72. The connecting band 72 is led out from the first side surface 74a and the second side surface 74b of the circuit board main body 71 and bent upward to form a bent portion, and the top of the bent portion extends along the periphery of the photosensitive assembly 20 in the horizontal direction, so that the connecting band 72 surrounds the periphery of the first side surface 74a, the second side surface 74b and the third side surface 74c of the photosensitive assembly 20. Moreover, the connecting bands located on the first side surface 74a and the second side surface 74b each have at least one suspension portion 75. The suspension portion 75 is fixed to the second basic portion 41 of the second driving part 40 or fixed to the second basic portion 41 through an intermediate object. The photosensitive assembly 20 has a first side surface 74a and a second side surface 74b that are at the same positions as those of the circuit board main body 71, the first side surface 74a and the second side surface 74b are arranged oppositely, and the third side surface 74c intersection with both the first side surface 74a and the second side surface 74b. The suspension portion 75 has a suspension hole 75a, the second basic portion 41 or the intermediate object has a hook, and the hook is hooked to the suspension hole 75a. A part of sections of the connecting band are attached to a rigid substrate for reinforcement to form the suspension portion (in a modified embodiment, the suspended circuit board may also adopt a rigid-flex board, wherein the circuit board main body and the suspension portion are formed by a rigid board part of the flex-rigid board, and the bent portion and connecting band sections connected between a plurality of suspension portion are formed by a flexible board part of the flex-rigid board). Different from the previous embodiment, in this embodiment, the third side surface 74c is not provided with a suspension portion, that is, the suspension portion 75 and the suspending hole 75a are only provided on the first side surface 74a and the second side surface 74b. Alternatively, in this embodiment, the connecting band of the third side surface 74c is fixed to the second basic portion 41 through an glue material (or fixed to the second basic portion 41 through an intermediate object). Specifically, in this embodiment, the connecting band may comprise a third connecting band 72a and a fourth connecting band 72b. The third connecting band 72a is led out from the first side surface 74a of the circuit board main body 71 and bent upward to form a bent portion 73, then extends along the first side surface 74a of the photosensitive assembly 20, is bent in the horizontal direction at the corner and continues to extend along the third side surface 74c. The fourth connecting band 72b is led out from the second side surface 74b of the circuit board main body 71 and bent upward to form another bent portion, then extends along the second side surface 74b of the photosensitive assembly 20, is bent horizontally at the corner and continues to extend along the third side surface 74c. The third connecting band 72a and the fourth connecting band 72b are joined and electrically conducted with each other at the third side surface 74c (which may be joined and electrically conducted by fastening of male and female connectors or by welding). Further, FIG. 18 shows a schematic exploded perspective view of a camera module based on a suspended circuit board in an embodiment of the present application. FIG. 19 shows a schematic perspective view of a camera module based on a suspended circuit board with a housing according to an embodiment of the present application. Referring to FIGS. 17a, 17b, 18 and 19 in combination, in this embodiment, the camera module further comprises a first connecting band 84 electrically connected to the first driving part. The first connecting band 84 is led out from the top area of the first driving part, then bent downward, and is jointed and electrically conducted with the third connecting band 72a or the fourth connecting band 72b at the third side surface 74c. The camera module further comprises a housing 81 and a module base 80, and the inner side surface of the housing 81 has an accommodating groove 82 for accommodating a joint portion of the third side surface 74c; wherein the joint portion is a join portion 83 where the first connecting band, the third connecting band 72a and the fourth connecting band 72b are joined with each other; and a glue material is filled into the accommodating groove 82 to fix the first connecting band, the third connecting band 72a and the fourth connecting band 72b to the housing 81. The module base 80 and the housing 81 can be fastened together, so that a first optical driving assembly 85 and a second optical driving assembly 86 are packaged inside the base 80 and the housing 81 (refer to FIGS. 18 and 19). Further, the connecting band located on the third side surface 74c is also connected to a fifth connecting band 76, and the fifth connecting band 76 has a connector 77 for external connection. The suspended circuit board may further have a fixing portion 76a for fixing the fifth connecting band 76. The first optical driving assembly 85 comprises a first driving part and an optical lens, and the optical lens is mounted in the first movable portion of the first driving part. The second optical driving assembly 86 comprises a second driving part and a photosensitive assembly, and the photosensitive assembly is fixed to the second movable portion of the second driving part.

When assembling, the first driving part and the optical lens may be assembled to form the first optical driving assembly 85, and the second driving part and the photosensitive assembly may be assembled to form the second optical driving assembly 86. Then, the relative positions of the optical lens and the photosensitive chip are adjusted through an active calibration process, and then the first driving part (the first basic portion) and the second driving part (the second basic portion) are bonded by glue. Next, the bonded first optical driving assembly 85 and the second optical driving assembly 86 are assembled in the through hole of the module housing 81 from bottom to top, and then the module base 80 is attached to the module housing 81. Finally, glue is filled into the accommodating groove 82 of the housing to fix the first optical driving assembly 85 and the second optical driving assembly 86 to the module housing 81. At the same time, glue is filled into the accommodating groove 82, and the joint portion of the first connecting band 84, the third connecting band 72a and the fourth connecting band 72b may also be fixed to the module housing 81, the first basic portion or the second basic portion.

In the above embodiment, each side surface of the second driving part is configured with a pair of SMA wires arranged in an interlaced manner to realize multi-axis driving, but this is not the only arrangement (i.e., SMA mounting manner) of SMA wires in the present application. Another SMA arrangement will be described below with reference to FIGS. 9a and 20-23.

Figure 20:
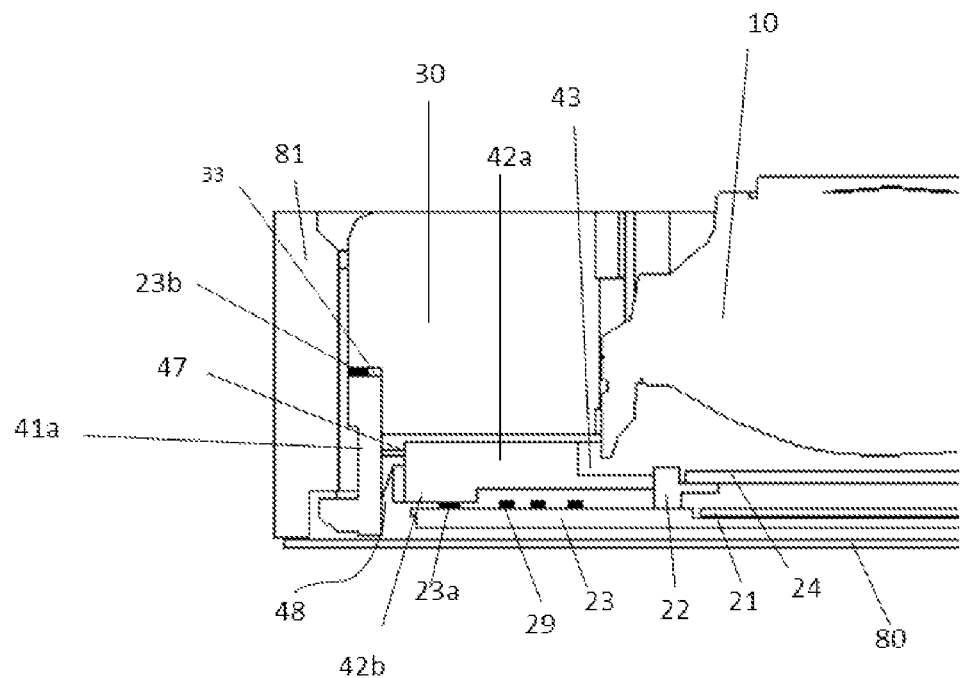
FIG. 20 shows a schematic sectional view of a camera module in an embodiment of the present application.

Referring to FIG. 9a, in another embodiment of the present application, the center of the first driving part has an accommodating hole 30a adapted to the outer surface of the optical lens 10, so that the optical lens 10 is mounted in the accommodating hole 30a. The second driving part 40 is located below the first driving part 30. The second driving part 40 comprises a second basic portion 41 and a second movable portion 42. In this embodiment, the second basic portion 41 may be an annular frame structure. Specifically, the frame structure may be formed by an annular basic portion side wall 41a, and the basic portion side wall 41a may surround the second movable portion 42. The top surface of the basic portion side wall 41a may be bonded to the first driving part 30 by means of a second glue material 23b, so as to fix the second driving part 40 together with the first driving part 30. It should be noted that only the overall shape of the first driving part 30 is shown in FIG. 9a, and the first basic portion and the first movable portion are not shown separately. Generally, the first basic portion is located on the periphery of the first movable portion. In this embodiment, an edge area of the bottom surface of the first driving part (i.e., an edge area of the bottom surface of the first basic portion) may form a step-shaped notch 33, and the basic portion side wall 41a of the second basic portion 41 may extend upward and into the step-shaped notch 33. This design can enhance the structural strength of the second basic portion 41 so as to more reliably mount the SMA wire and the second movable portion 42 and the photosensitive assembly 20 suspended thereon. Further, this design also improves the rigidity of the connection between the second basic portion 41 and the first driving part so that the movement of the second movable portion 42 is more stable and more accurate. Further, FIG. 20 shows a schematic sectional view of a camera module in an embodiment of the present application. Referring to FIGS. 9*a* and 20 in combination, in this embodiment, the bottom surface of the second movable portion 42 may be bonded to the circuit board 23 of the photosensitive assembly 20 through a first glue material 23*a*, so as to fix the photosensitive assembly 20 together with the second movable portion 42. There is a gap between the outer side surface of the second movable portion 42 and the inner side surface of the second basic portion 41 (i.e., the inner side of the basic portion side wall 41*a*), and the gap can be used for accommodating the SMA wire 48 and for accommodating a leaf spring 47 which supports the second movable portion 41. Specifically, the second basic portion 41 and the second movable portion 42 can be movably connected by means of a leaf spring 47 (the leaf spring may also be replaced with other elastic connecting portions). The SMA wire may also be connected between the second basic portion 41 and the second movable portion 42 to provide a driving force for the movement of the second movable portion 42.

Further, still referring to FIG. 20, in an embodiment of the present application, the second movable portion 42 may comprise a movable portion main body 42*a*, the movable portion main body 42*a* is generally of a flat plate shape, and the center of the movable portion main body 42*a* has a through hole (i.e., a light-passing hole) to allow the light used for imaging to pass through. The outer edge area of the bottom surface of the movable portion main body 42*a* extends downward to form a movable portion side wall 42*b*, and the bottom surface of the movable portion side wall 42*b* is bonded to the upper surface of the circuit board 23. An accommodating cavity is formed between the inner side surface of the movable portion side wall 42*b*, the bottom surface of the movable portion main body 42*a*, the upper surface of the circuit board 23 and the outer side surface of the lens holder 22, and the accommodating cavity can be used for arranging electronic elements 29. The electronic elements 29 comprise a resistor, a capacitor, etc. These electronic elements 29 may form circuits (i.e., functional circuits required by the camera module) of the circuit board together with the wiring in the circuit board 23.

Further, still referring to FIG. 20, in an embodiment of the present application, the inner side edge of the movable portion main body has a step-shaped notch 43, so as to avoid the optical lens 10, so that the optical lens 10 can have a greater movement range (i.e., having a larger focusing stroke or image stabilization stroke).

Figure 21:
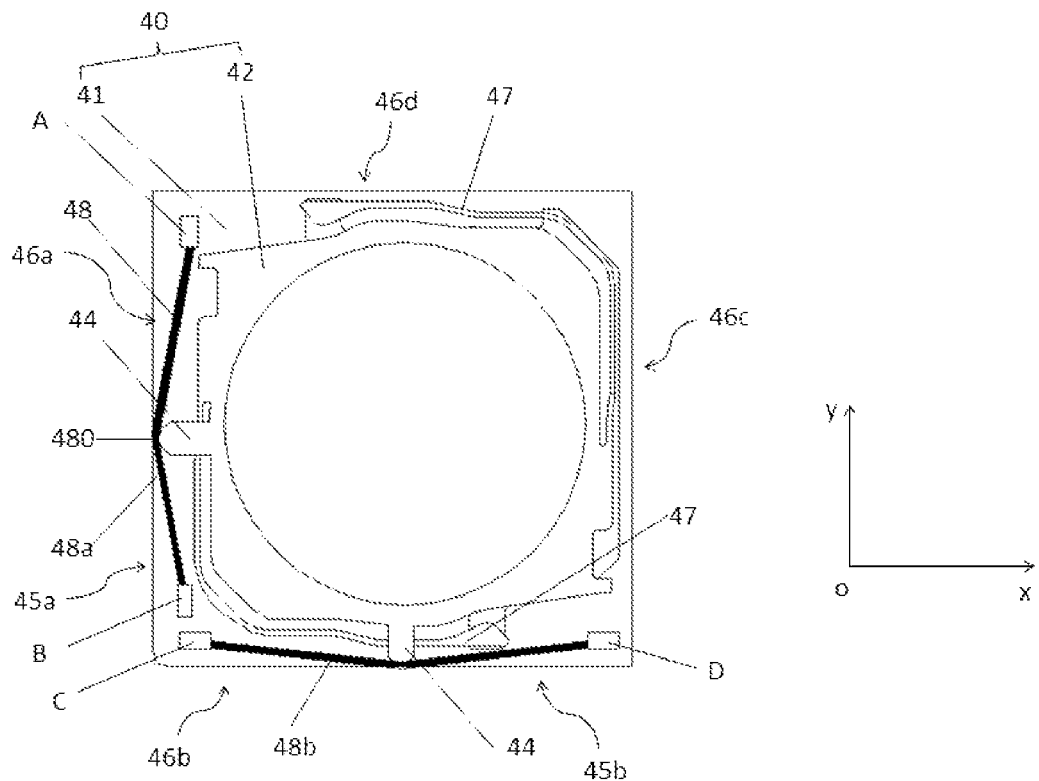
FIG. 21 shows a schematic top view of a second driving part in an embodiment of the present application.

Further, FIG. 21 shows a schematic top view of a second driving part in an embodiment of the present application. Referring to FIG. 21, in this embodiment, the second basic portion 41 may comprise a basic portion base 41*b* and a basic portion sidewall 41*a* mounted on the basic portion base 41*b* (refer to FIG. 22 in combination). An end surface of the basic portion side wall 41*a* may be connected to the edge area of the basic portion base 41*b*, or the basic portion side wall 41*a* and the basic portion base 41*b* may be integrally molded. The photosensitive assembly can be fixed on the second movable portion 42, the second basic portion 41 and the second movable portion 42 are movably connected by an elastic connecting portion (e.g., a leaf spring 47), and the second driving part 40 has four side surfaces, wherein at least one SMA wire 48 is arranged on at least one side surface of the second driving part 40. Each SMA wire 48 is located in the gap between the outer side surface of the second movable portion 42 and the inner side surface of the second basic portion 41, two ends of each SMA wire 48 are fixed and electrically connected to two fixed ends located on the second basic portion 41 (for example, a first fixed end A and a second fixed end B, or a third fixed end C and a fourth fixed end D), respectively, and the two fixed ends are located in two adjacent corner areas (for example, a first corner and a second corner, or a second corner and a third corner; wherein the first corner and the third corner are diagonal to each other, and the second fixed end B and the third fixed end C may both be located at the second corner, that is, the second corner is a common corner), respectively. The outer side surface of the second movable portion 42 has an extension portion 44, the extension portion 44 is in contact with a waist part 48*a* of the SMA wire 48, and the extension portion 44 presses, under the action of the elasticity of the elastic connecting portion (e.g., a leaf spring 47), against the SMA wire 48 along the x-axis or y-axis direction at the waist part 48*a* of the SMA wire 48 to make it bend. The second driving part 40 causes the SMA wire 48 to shrink by applying an electric current to the SMA wire 48, so as to move the photosensitive chip in the x-axis or y-axis direction. On the other hand, in this embodiment, the first driving part is adapted to drive the lens to translate in the x-axis and y-axis directions. The lens and the photosensitive chip are configured to be simultaneously driven and move in opposite directions; wherein the x-axis and the y-axis are coordinate axes perpendicular to an optical axis of the camera module, and the x-axis and the y-axis are perpendicular to each other. Further, in this embodiment, the SMA wire 48 comprises an x-axis driving SMA wire and a y-axis driving SMA wire; at least one x-axis driving SMA wire 48*a* is arranged on at least one side surface 45*a* of the second driving part that is perpendicular to the x-axis, and the second driving part causes the x-axis driving SMA wire 48*a* to shrink by applying an electric current to the x-axis driving SMA wire 48*a*, so as to move the second movable portion 42 in the x-axis direction, thereby driving the photosensitive chip to move in the x-axis direction. In addition, at least one y-axis driving SMA wire 48*b* is arranged on at least one side surface 45*b* of the second driving part 40 that is perpendicular to the y-axis, and the second driving part 40 causes the y-axis driving SMA wire 48*b* to shrink by applying an electric current to the y-axis driving SMA wire 48*b*, so as to move the second movable portion 42 in the x-axis direction, thereby driving the photosensitive chip to move in the y-axis direction.

In some embodiments of the present application, the extension portion may be configured as a hook, a roller or an arc track.

Still referring to FIG. 21, in some embodiments of the present application, the second basic portion 40 has four corner areas, wherein three corner areas have the fixed ends, and the fixed end of one corner area is fixed to both the x-axis driving SMA wire 48*a* and the y-axis driving SMA wire portion 48*b*. The second driving part 40 has a first side 46*a*, a second side 46*b* intersecting with the first side 46*a*, a third side 46*c* opposite to the first side 46*a*, and a fourth side 46*d* opposite to the second side 46*b*. The x-axis driving SMA wire 45*a* is only provided on the first side 46*a*, and the y-axis driving SMA wire 45*b* is only provided on the second side portion 46*b*. Further, in an embodiment of the present application, the second driving part may be provided with only one x-axis driving SMA wire and one y-axis driving SMA wire. This design can reduce the number of SMA wires, which helps to reduce the lateral dimension of the camera module. Here, the lateral dimension may also be referred to as a radial dimension, i.e., the dimension in a direction perpendicular to the optical axis of the camera module.

Figure 22:
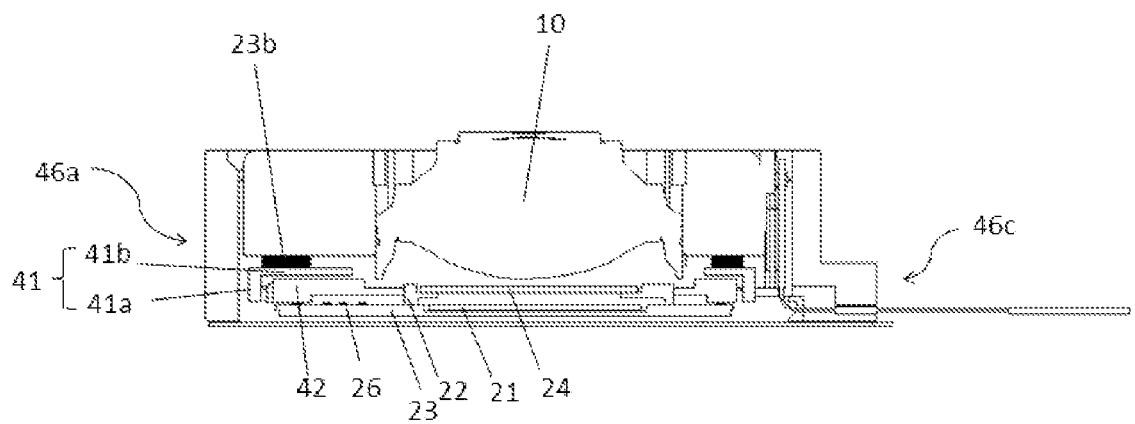
FIG. 22 shows a schematic sectional view of a camera module in an embodiment of the present application.
Figure 23:
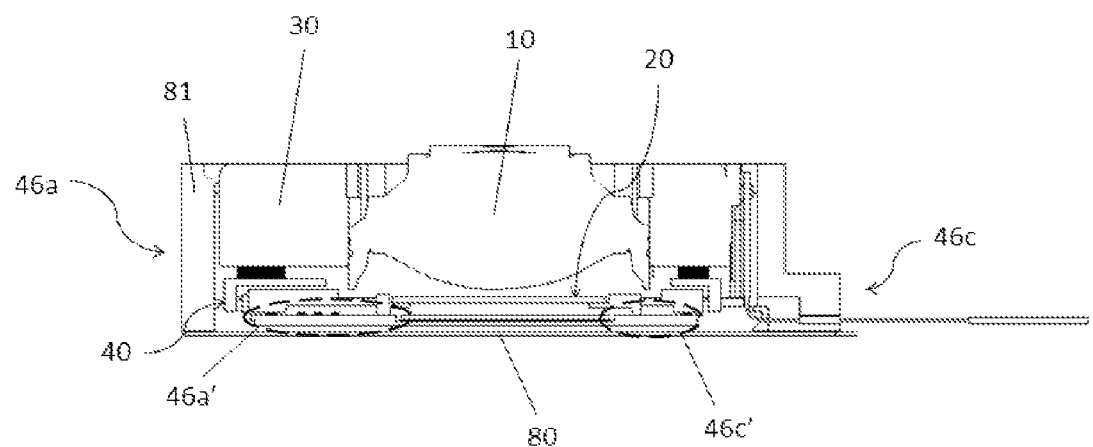
FIG. 23 shows a schematic sectional view with marking a part of edge areas of a circuit board based on the camera module of FIG. 22.

Further, in some embodiments of the present application, in the second driving part, a gap between an inner side surface of the second basic portion located on the first side and an outer side surface of the second movable portion (i.e., a gap between the basic portion side wall 41a located on the first side and the second movable portion 42) is larger than a gap between an inner side surface of the second basic portion located on the third side and the outer side surface of the second movable portion (i.e., a gap between the basic portion side wall 41a located on the third side and the second movable portion 42). A gap between an inner side surface of the second basic portion located on the second side and the second movable portion is larger than a gap between an inner side surface of the second basic portion located on the fourth side and the second movable portion. Further, FIG. 22 shows a schematic sectional view of a camera module in an embodiment of the present application. Referring to FIG. 22, in this embodiment, the photosensitive assembly 20 may comprise a photosensitive chip, a circuit board and electronic elements 26 mounted on the surface of the circuit board 26. The photosensitive chip 21 is mounted in a central area of the circuit board 23, the electronic elements 26 are located on an outer side of the photosensitive chip 21, and the electronic elements 26 are all located on the first side 46a and/or the second side 46b (i.e., a side provided with the x-axis driving SMA wire and/or the y-axis driving SMA wire). Further, FIG. 23 shows a schematic sectional view with marking a part of edge areas of a circuit board based on the camera module of FIG. 22. Referring to FIG. 23, in this embodiment, in the photosensitive assembly, the circuit board 23 has four edge areas, which are a first edge area 46a' located on the first side 46a, a second edge area located on the second side 46b, a third edge area 46c' located on the third side 46c, and a fourth edge area located on the fourth side 46d, respectively; a width of the third edge area is smaller than that of the first edge area; and a width of the fourth edge area is smaller than that of the first edge area, wherein the respective width of a respective edge area represents a distance from an edge of the photosensitive chip to an edge of the circuit board. In this embodiment, the electronic elements may be concentrated on the first side and the second side of the circuit board, so as to effectively utilize the lateral space for arranging the SMA wires, and reduce the lateral space occupied by the circuit board and the second driving part on the third side and the fourth side, thereby helping to reduce the lateral dimension of the camera module. Here, the lateral dimension may also be referred to as a radial dimension, i.e., the dimension in a direction perpendicular to the optical axis of the camera module.

Further, in an embodiment of the present application, in the second driving part, the extension portion and the fixed end are at different heights, the height represents a position in a direction of a z-axis, and the z-axis is a coordinate axis perpendicular to the x-axis and the y-axis. In this embodiment, optionally, the extension portion may be higher than the fixed end (meaning that the position of the contact point between the extension portion and the SMA wire is higher than the position of the contact point between the fixed end and the SMA wire), so that an acting force the SMA wire can apply to the extension portion has a downward (downward along the z-axis) component. This downward component cooperates with the leaf spring (or referred to as a flexure member), so that the movement of the second movable portion in the z-axis direction can be better limited, that is, the image stabilization movement of the second movable portion can be more reliably limited within the xoy plane. In contrast, if only the leaf spring is used to limit the movement of the second movable portion in the z-axis direction, sometimes the shift of the second movable portion in the z-axis direction cannot be prevented.

Further, in the camera module, the circuit board of the photosensitive assembly usually comprises a rigid circuit board main body and a flexible connecting band, one end of the flexible connecting band is connected to the circuit board main body, and the other end is connected and electrically conducted with a motherboard or other components of an electronic device through a connector. In the prior art, the flexible connecting band of the photosensitive assembly is usually led out from the side surface of the circuit board main body, and the flexible connecting band is roughly parallel to the surface of the circuit board main body. In this arrangement, the flexible connecting band will have a greater resistance to the movement of the circuit board main body, which may increase the force required to drive the movement of the circuit board main body, resulting in insufficient stroke for image stabilization compensation and reduced response speed. In addition, the resistance caused by the connecting band is irregular, so that it is difficult for the second driving part to compensate for the resistance, which may result in a decrease in the accuracy of the image stabilization compensation. Therefore, in the present application, a suspended circuit board is provided as a circuit board of a photosensitive assembly adapted to the second driving part, and this design manner will help to overcome the above defects caused by the connecting band. Such a suspended circuit board can be applied to the embodiments of the SMA mounting manner shown in FIGS. 20-23. Various technical details of the suspended circuit board have been described above in combination with FIGS. 13-19, and are not repeated here.

Only preferred implementations of the present application and an explanation of the applied technical principle are described above. It should be understood by those skilled in the art that the scope of disclosure involved in the present application is not limited to technical solutions formed by specific combinations of the above technical features, and at the same time, should also cover other technical solutions formed by any combination of the above technical features or equivalent features thereof without departing from the concept of the disclosure. For example, the above features and (but not limited to) the technical features with similar functions disclosed in the present application are replaced with each other to form technical solutions.

What is claimed is:

1. An optical image stabilization camera module, comprising:
    a lens;
    a photosensitive assembly having a photosensitive chip;
    a first driving part adapted to mount the lens and drive the lens to translate in the directions of an x-axis and a y-axis; and
    a second driving part comprising a second basic portion and a second movable portion, wherein the second basic portion and the second movable portion are movably connected by means of an elastic connecting portion, and the second driving part has four side surfaces; each side surface is provided with two interlaced shape memory alloy (SMA) wires, and two ends of each SMA wire are connected to a fixed end of the second basic portion and a fixed end of the second movable portion, respectively; and each of the fixed ends is located in a corner area of the second basic portion or the second movable portion;

wherein the photosensitive assembly is fixed on the second movable portion, and the second movable portion is adapted to drive, under the drive of the SMA wires, the photosensitive chip to move in an xoy plane; and wherein the lens and the photosensitive chip are configured to be simultaneously driven and move in opposite directions; and wherein the x-axis and the y-axis are coordinate axes perpendicular to an optical axis of the camera module, the x-axis and the y-axis are perpendicular to each other, and the xoy plane is a plane formed by the x-axis and the y-axis.

2. The optical image stabilization camera module according to claim 1, wherein the second driving part has four corner areas, each corner area is provided with two fixed ends, and the two ends of each SMA wire are fixed and electrically connected to the fixed ends of two adjacent corner areas, respectively.

3. The optical image stabilization camera module according to claim 2, wherein in any one of the corner areas, the two fixed ends are arranged along a direction of the optical axis.

4. The optical image stabilization camera module according to claim 3, wherein the four corner areas comprise a first corner, a second corner, a third corner and a fourth corner, wherein the first corner and the third corner are located on a first diagonal line of the second driving part, and the second corner and the fourth corner are located on a second diagonal line of the second driving part;

the second movable portion extends outward at the first corner and the third corner respectively to form a first extension portion and a third extension portion;

the two fixed ends of the first corner of the second driving part are provided on the first extension portion, and the two fixed ends of the third corner of the second driving part are provided on the third extension portion;

the two fixed ends of the second corner of the second driving part are provided at a second corner of the second basic portion, and the two fixed ends of the fourth corner of the second driving part are provided at a fourth corner of the second basic portion;

for each side surface of the second driving part, the two interlaced SMA wires provided on the side surface are fixed and electrically connected to the four fixed ends located in the two corner areas of the side surface;

wherein a translational component of the photosensitive chip in a direction of the first diagonal line or in a direction of the second diagonal line is generated by driving two pairs of interlaced SMA wires on two intersecting side surfaces of the second driving part to shrink; and the translational component in the direction of the first diagonal line is combined with the translational component in the direction of the second diagonal line, so that a movement direction of the photosensitive chip in the xoy plane is opposite to a movement direction of the lens.

5. The optical image stabilization camera module according to claim 4, wherein rotation of the photosensitive chip in an Rz direction is generated by driving two pairs of interlaced SMA wires on two opposite side surfaces of the second driving part to shrink, wherein the Rz direction is a direction of rotation around a z-axis, and the z-axis is a coordinate axis parallel to the optical axis;

a rotation component of the photosensitive chip in an Rx or Ry direction is generated by driving a single SMA wire on a single side surface of the second driving part to shrink; wherein the Rx direction is a direction of rotation around the x-axis, and the Ry direction is a direction of rotation around the y-axis;

translation of the photosensitive chip in a direction of a z-axis is generated by driving a first group of SMA wires and a second group of SMA wires of the second driving part to shrink; and a translation direction of the photosensitive chip in the z-axis direction is opposite to a translation direction of the lens in the z-axis direction, wherein the z-axis is a coordinate axis parallel to the optical axis;

wherein the first group of SMA wires are two SMA wires with a first common fixed end, and the two SMA wires are located on two intersecting side surfaces of the second driving part, respectively; the second group of SMA wires are the other two SMA wires with a second common fixed end, and the other two SMA wires are located on the other two intersecting sides of the second driving part; and each of the first common fixed end and the second common fixed end is one of eight fixed ends of the second driving part, and the first common fixed end and the second common fixed end are located at the same height.

6. The optical image stabilization camera module according to claim 2, wherein the four fixed ends of any two adjacent corner areas are all located in a plane parallel to the xoy plane.

7. The optical image stabilization camera module according to claim 2, wherein the two fixed ends of each corner area comprise a type-A fixed end and a type-B fixed end, wherein the type-A fixed end and the type-B fixed end are at different heights;

the type-A fixed ends located in two diagonal corner areas are at the same height, and the type-B fixed ends located in two diagonal corner areas are also at the same height; each side surface of the second driving part is provided with two SMA wires, wherein the two ends of each SMA wire are connected to one of the type-A fixed ends and one of the type-B fixed ends located in adjacent corner areas, respectively, so that the two SMA wires are interlaced with each other;

the four type-A fixed ends of the four corner areas are at the same height; and the four type-B fixed ends of the four corner areas are at the same height;

the type-A fixed end and the type-B fixed end located in the same corner area are stacked, and the two are separated by an insulating material.

8. The optical image stabilization camera module according to claim 7, wherein the four corner areas comprise a first corner, a second corner, a third corner and a fourth corner, wherein the first corner and the third corner are located on one diagonal line of the second driving part, and the second corner and the fourth corner are located on the other diagonal line of the second driving part; the second movable portion extends outward at the first corner and the third corner respectively to form a first extension portion and a third extension portion; and the first extension portion is provided with a first A fixed end and a first B fixed end at different heights, and the third extension portion is provided with a third A fixed end and a third B fixed end at different heights;

a second A fixed end and a second B fixed end at different heights are provided at a position of the second corner of the second basic portion; and a fourth A fixed end and a fourth B fixed end at different heights are provided at a position of the fourth corner of the second basic portion; and the first A fixed end, the second A fixed end, the third A fixed end and the fourth A fixed end all belong to the type-A fixed ends; and the first B fixed end, the second B fixed end, the third B fixed end and the fourth B fixed end all belong to the type-B fixed ends;

the second movable portion further has notches at the second corner and the fourth corner, respectively, to avoid the fixed ends provided on the second basic portion.

9. The optical image stabilization camera module according to claim 8, wherein the second movable portion is further adapted to drive, under the drive of the SMA wires, the photosensitive chip to move in a direction of rotation around a z-axis; the second movable portion is further adapted to drive, under the drive of the SMA wires, the photosensitive chip to move in a direction of translation along a z-axis; wherein the z-axis is a coordinate axis parallel to the optical axis.

10. The optical image stabilization camera module according to claim 1, wherein the first driving part comprises a first basic portion and a first movable portion, and the second basic portion is fixed on the first basic portion;

the first basic portion is located on the periphery of the first movable portion; the second basic portion comprises a basic portion side wall and a base, a bottom surface of the basic portion side wall is connected to the base, and a top surface of the basic portion side wall is connected to the first basic portion;

an edge area of the bottom surface of the first basic portion forms a step-shaped notch, and the basic portion side wall can extend upward and into the step-shaped notch and be connected to the first basic portion;

the second movable portion comprises a movable portion main body, the movable portion main body is of a flat plate shape, and has a light-passing hole in its center; and an outer edge area of a bottom surface of the movable portion main body extends downward to form a movable portion side wall;

an inner edge area of the movable portion main body has a step-shaped notch facing an object side to avoid part of a structure of the optical lens.

11. The optical image stabilization camera module according to claim 1, wherein the second basic portion is fixed to the first driving part, the second basic portion comprises a basic portion side wall, the basic portion side wall surrounds the second movable portion, and there is a gap between the basic portion side wall and the second movable portion for accommodating the SMA wires.

12. The optical image stabilization camera module according to claim 1, wherein the photosensitive assembly comprises a suspended circuit board, and the suspended circuit board comprises a rigid circuit board main body and a flexible connecting band; the connecting band is led out from a first side surface and a second side surface of the circuit board main body and bent upwards to form a bent portion; a top part of the bent portion extends along the periphery of the photosensitive assembly in a horizontal direction, so that the connecting band surrounds the periphery of a first side surface, a second side surface and a third side surface of the photosensitive assembly; and the connecting band has at least one suspension portion on each of the first side surface and the second side surface, and the suspension portion is fixed to the second basic portion of the second driving part or fixed to the second basic portion through an intermediate object;

wherein the photosensitive assembly has a first side surface and a second side surface which are at the same positions as those of the circuit board main body, the first side surface and the second side surface are arranged oppositely, and the third side surface intersects both the first side surface and the second side surface.

13. The optical image stabilization camera module according to claim 12, wherein the suspended circuit board is made of a rigid-flex board, wherein the circuit board main body and the suspension portion are formed by a rigid board part of the rigid-flex board, and the bent portion and a connecting band section connected between a plurality of suspension portions are formed by a flexible board part of the rigid-flex board.

14. The optical image stabilization camera module according to claim 13, wherein the connecting band comprises a third connecting band and a fourth connecting band, and the third connecting band is led out from the first side surface of the circuit board main body and bent upward to form a bent portion, then extends along the first side surface of the photosensitive assembly, is bent in a horizontal direction at a corner and continues to extend along the third side surface; the fourth connecting band is led out from the second side surface of the circuit board main body and bent upward to form another bent portion, then extends along the second side surface of the photosensitive assembly, and is horizontally bent at a corner and continues to extend along the third side surface; and the third connecting band and the fourth connecting band are joined and electrically conducted with each other at the third side surface;

the camera module further comprises a first connecting band electrically connected to the first driving part, and the first connecting band is led out from a top area of the first driving part, then bent downward and jointed and electrically conducted with the third connecting band or the fourth connecting band on the third side surface;

the connecting band located on the third side surface is further connected to a fifth connecting band, and the fifth connecting band has a connector for external connection; and the suspended circuit board further has a fixing portion for fixing the fifth connecting band.

15. The optical image stabilization camera module according to claim 14, wherein the camera module further comprises a housing, and an inner side surface of the housing has an accommodating groove for accommodating a joint portion of the third side surface; wherein the joint portion represents a joint portion where the first connecting band, the third connecting band and the fourth connecting band are joined to each other; and the accommodating groove is filled with a glue material to fix the first connecting band, the third connecting band and the fourth connecting band to the housing.

16. The optical image stabilization camera module according to claim 1, wherein a lens movement distance b by which the first driving part drives the lens to move, and a photosensitive chip movement distance c by which the second driving part drives the photosensitive chip to move, are determined according to a detected tilt-shake angle a of the camera module; wherein the lens movement distance b, the photosensitive chip movement distance c and an image-side focal length f of the camera module satisfy: a=arctan(b/f)+arctan(c/f).

17. The optical image stabilization camera module according to claim 16, wherein it further comprises a driving logic module, which is configured to maintain a ratio between the lens movement distance b and the photosensitive chip movement distance c at a preset fixed ratio;

the driving logic module has an image stabilization threshold K; the driving logic module is configured to: when the tilt-shake angle a is less than or equal to the image stabilization threshold K, cause a ratio of the lens movement distance b and the photosensitive chip movement distance c to maintain at a preset fixed ratio, and when the tilt-shake angle a is greater than the image stabilization threshold K, cause the photosensitive chip movement distance c to reach a maximum value Cmax of its moving stroke; and the lens movement distance b is calculated according to a relational formula b=tan(a/f)−$C_{max}$.

18. The optical image stabilization camera module according to claim 17, wherein the preset fixed ratio of the lens movement distance to the photosensitive chip movement distance is set according to weight of the lens, driving force of the first driving part, weight of the photosensitive chip or the photosensitive assembly, and driving force of the second driving part, so that the lens and the photosensitive chip move to their respective image stabilization target positions in the same time.

19. An optical image stabilization camera module, comprising:
 a lens;
 a photosensitive assembly having a photosensitive chip;
 a first driving part adapted to mount the lens and drive the lens to translate in a direction of an x-axis or a y-axis; and
 a second driving part comprising a second basic portion and a second movable portion,
 wherein the photosensitive assembly is fixed to the second movable portion, the second basic portion and the second movable portion are movably connected by means of an elastic connecting portion, the second driving part has four side surfaces, and at least one shape memory alloy (SMA) wire is arranged on at least one side surface of the second driving part;
 wherein each SMA wire is located in a gap between the second movable portion and the second basic portion, and two ends of the SMA wires are fixed and electrically connected to two fixed ends located at the second basic portion, respectively, and the two fixed ends are located in two adjacent corner areas of the second basic portion, respectively;
 an outer side surface of the second movable portion has an extension portion, the extension portion is in contact with a waist part of the SMA wire, and the extension portion presses, under the action of the elasticity of the elastic connecting portion, against the SMA wire along the x-axis or y-axis direction at the waist part of the SMA wire to make it bend;
 the second driving part causes the SMA wire to shrink by applying an electric current to the SMA wire, so as to move the photosensitive chip in the x-axis or y-axis direction; and
 the lens and the photosensitive chips are configured to be driven simultaneously and move in opposite directions;
 wherein the x-axis and the y-axis are coordinate axes perpendicular to an optical axis of the camera module, and the x-axis and the y-axis are perpendicular to each other.

20. The optical image stabilization camera module according to claim 19, wherein the first driving part is adapted to drive the lens to translate in the directions of the x-axis and the y-axis;
 the SMA wire comprises an x-axis driving SMA wire and a y-axis driving SMA wire; at least one x-axis driving SMA wire is arranged on at least one side surface of the second driving part that is perpendicular to the x-axis, and the second driving part causes the x- axis driving SMA wire to shrink by applying an electric current to the x-axis driving SMA wire, so as to move the second movable portion in the x-axis direction, thereby driving the photosensitive chip to move in the x-axis direction; and
 at least one y-axis driving SMA wire is arranged on at least one side surface of the second driving part that is perpendicular to the y-axis, and the second driving part causes the y-axis driving SMA wire to shrink by applying an electric current to the y-axis driving SMA wire, so as to move the second movable portion in the y-axis direction, thereby driving the photosensitive chip to move in the y-axis direction.

* * * * *